(12) United States Patent
Makino et al.

(10) Patent No.: US 8,970,753 B2
(45) Date of Patent: Mar. 3, 2015

(54) SOLID-STATE IMAGING DEVICE AND CAMERA SYSTEM

(75) Inventors: Eiji Makino, Kanagawa (JP); Tetsuji Nakaseko, Fukuoka (JP); Ryoji Eki, Kanagawa (JP); Youji Sakioka, Kanagawa (JP)

(73) Assignee: Sony Corporation, Tokyo (JP)

( * ) Notice: Subject to any disclaimer, the term of this patent is extended or adjusted under 35 U.S.C. 154(b) by 589 days.

(21) Appl. No.: 13/067,594

(22) Filed: Jun. 13, 2011

(65) Prior Publication Data

US 2012/0008027 A1  Jan. 12, 2012

(30) Foreign Application Priority Data

Jul. 9, 2010  (JP) ................................ 2010-157337

(51) Int. Cl.
| | | |
|---|---|---|
| H04N 3/14 | (2006.01) | |
| H04N 5/335 | (2011.01) | |
| H04N 5/359 | (2011.01) | |
| H04N 5/347 | (2011.01) | |
| H04N 5/374 | (2011.01) | |
| H04N 5/376 | (2011.01) | |

(Continued)

(52) U.S. Cl.
CPC ............. *H04N 5/3591* (2013.01); *H04N 5/347* (2013.01); *H04N 5/374* (2013.10); *H04N 5/376* (2013.01); *H04N 5/35509* (2013.01)
USPC .......................................... 348/296; 257/223

(58) Field of Classification Search
USPC .................. 348/296–299; 358/482, 513, 514; 257/222, 223, 225–234, 257, 258, 291, 257/292, 294, 431–448
See application file for complete search history.

(56) References Cited

U.S. PATENT DOCUMENTS

| | | | |
|---|---|---|---|
| 2008/0284762 A1* | 11/2008 | Sakioka et al. ............... | 345/204 |
| 2008/0284876 A1 | 11/2008 | Makino | |

(Continued)

FOREIGN PATENT DOCUMENTS

| | | |
|---|---|---|
| EP | 0 863 663 A2 | 9/1998 |
| EP | 2 190 188 A1 | 5/2010 |

(Continued)

OTHER PUBLICATIONS

Japanese Office Action issued Dec. 10, 2013 for corresponding Japanese Application No. 2010-157337.

(Continued)

*Primary Examiner* — Christopher K Peterson
(74) *Attorney, Agent, or Firm* — Rader, Fishman & Grauer PLLC

(57) ABSTRACT

A solid-state imaging device includes: a pixel section wherein pixels including photoelectric conversion devices are arranged in a matrix; and a pixel driving section including a row selection circuit which controls the pixels to perform an electronic shutter operation and readout of the pixel section. The row selection circuit has a function of selecting a readout row from which a signal is read out and a shutter row on which reset is performed by discharging charge accumulated in the photoelectric conversion devices, in accordance with address and control signals. The row selection circuit can set, in accordance with the address and control signals, in the pixels of the selected row, at least a readout state, a discharge state where a smaller amount of the charge accumulated in the photoelectric conversion devices than the reset is discharged, an electronic shutter state, and a charge state where the charge is accumulated in the photoelectric conversion devices.

10 Claims, 19 Drawing Sheets

(51) Int. Cl.
*H04N 5/355* (2011.01)
*H01L 27/148* (2006.01)

(56) References Cited

U.S. PATENT DOCUMENTS

2008/0284884 A1* 11/2008 Makino et al. ................ 348/296
2009/0086049 A1* 4/2009 Fujita et al. ................ 348/222.1

FOREIGN PATENT DOCUMENTS

| JP | 11-027582 | 1/1999 |
| --- | --- | --- |
| JP | 2007-088972 A | 4/2007 |
| JP | 2008-193618 A | 8/2008 |
| JP | 2008-288903 | 11/2008 |
| JP | 2008-288904 A | 11/2008 |
| JP | 2009-021889 A | 1/2009 |
| JP | 2009-065585 A | 3/2009 |
| JP | 2009-089069 A | 4/2009 |

OTHER PUBLICATIONS

Extended European Search Report issued Apr. 3, 2014 for corresponding European Application No. 11169689.4-1902 / 2418844.

* cited by examiner

SOLID-STATE IMAGING DEVICE AND CAMERA SYSTEM

FIELD

The present disclosure relates to a solid-state imaging device and a camera system.

BACKGROUND

CMOS (Complementary Metal Oxide Semiconductor) image sensors (CIS) are characterized as compared with CCD (Charge Coupled Device) image sensors in that it is possible to relatively freely set a readout address.

For example, a widely used sensor thereof is a sensor that has not only a function of readout of all the pixels of the sensor but also functions of "addition" which simultaneously reads out signals of a plurality of pixels, "thinning-out" which intermittently reads out the signals while skipping rows or columns, "cutout" which reads out only from some pixels, and the like.

Sometimes "addition", "thinning-out" and "cutout" may be simultaneously performed.

In the sensor having the functions of "thinning-out", "addition", and "cutout", the readout and shutter operation becomes complicated. Hence, inmost cases, for row selection, not shift registers but decoders are used.

In image sensors, there is a known phenomenon called blooming in which signal charge overflows from saturated photodiodes (hereinafter referred to as PDs) to adjacent PDs and thereby the signal amount changes.

In other words, the blooming is defined as a phenomenon in which electric charge is accumulated in photodiodes until it becomes saturated and the electric charge overflows from the photodiodes to adjacent pixels when light incidence is further continued.

Modes, in which deterioration in image quality is caused by the blooming, are roughly classified into two types. In a thinning-out operation of a CMOS sensor as one mode thereof, extra electric charge of pixels, which do not contribute to the output signals of the sensor, is collected, and this electric charge overflows in the pixels which contribute to the sensor output signals. In this case, image quality significantly deteriorates.

As a countermeasure for the blooming in the thinning-out mode, for example, there has been proposed a method of discharging the extra electric charge by generating an electronic shutter with a circuit configuration in which a decoder and a 2-bit memory are disposed in each row of the vertical selection circuit (refer to JP-A-2008-288903).

Further, there has been proposed a specific method of controlling addresses of the decoders (refer to JP-A-2008-288904).

SUMMARY

As it is, in the methods, in order to achieve a high thinning-out rate, a discharge operation using multiple electronic shutters is necessary. As a result, as the number of decoding accesses increases, not only power consumption but also more decoding time becomes necessary. Thus, there has been an issue of an increase in speed of the readout operation.

As a solution for the issue, the technique disclosed in JP-A-2009-65585 is known.

This technique adopts a method of using the 2-bit memory output signal as a third memory set signal and a reset signal with the 2-bit memory disposed in the V selection circuit disclosed in JP-A-2008-288903 mentioned above.

By using this method, a 3-bit memory (a latch) generates four states.

However, in general, when the 2-bit memory is used, it is possible to control a maximum of four states, and when the 3-bit memory is used, it is possible to control eight states, while a problem arises in that memory-use efficiency is low.

On the other hand, there are modes, in which blooming occurs, including not only the thinning-out operation of the CMOS sensor but also all the pixel operations.

In a driving mode in which the adjacent pixels contributing to the sensor output signals are read out, after the electric charge of one readout pixel is saturated, light is further incident, thereby causing a phenomenon in which the electric charge overflows into peripheral pixels.

As a counter measure therefor, there has been proposed a pixel voltage setting method of generating periods of at least two kinds of pixel transfer gate voltages in a charge period. In this method, by setting the overflow level of the first period higher than that of the second period, blooming of the charged pixels is suppressed (refer to Japanese Patent No. 3915161).

However, in this method, the pixel access control becomes complicated. Accordingly, it is difficult to apply this method to the circuit configurations in the related art, and there has not been proposed any specific circuit of the vertical selection circuit for driving pixels and any method of controlling the vertical selection circuit.

Thus, it is desirable to provide a solid-state imaging device and a camera system capable of appropriately suppressing blooming of electric charge while suppressing an increase in circuit size and thereby capable of performing a high-speed readout.

An embodiment of the present disclosure is directed to a solid-state imaging device including: a pixel section in which a plurality of pixels including photoelectric conversion devices converting optical signals into electric signals and accumulating the electric signals in accordance with an exposure period are arranged in a matrix shape; and a pixel driving section that includes a row selection circuit which controls operations of the pixels so as to perform an electronic shutter operation and readout of the pixel section. The row selection circuit has a function of selecting a readout row from which a signal is read out and a shutter row on which resetting is performed by discharging electric charge accumulated in the photoelectric conversion devices, in accordance with address and control signals. The row selection circuit is able to set, in accordance with the address and control signals, in the pixels of the selected row, at least a readout state, a discharge state in which a smaller amount of the electric charge accumulated in the photoelectric conversion devices than the reset is discharged, an electronic shutter state, and a charge state in which the electric charge is accumulated in the photoelectric conversion devices.

Another embodiment of the present disclosure is directed to a camera system including: a solid-state imaging device; an optical system that forms a subject image on the solid-state imaging device; and a signal processing circuit that processes an output image signal of the solid-state imaging device. The solid-state imaging device includes: a pixel section in which a plurality of pixels including photoelectric conversion devices converting optical signals into electric signals and accumulating the electric signals in accordance with an exposure period are arranged in a matrix shape; and a pixel driving section that includes a row selection circuit which controls operations of the pixels so as to perform an electronic shutter operation and readout of the pixel section. The row selection circuit has a function of selecting a readout row from which a signal is read out and a shutter row on which resetting is performed by discharging electric charge accumulated in the photoelectric conversion devices, in accordance with address and control signals. The row selection circuit is able to set, in accordance with the address and control signals, in the pixels of the selected row, at least a readout state, a discharge state in which a smaller amount of the electric charge accumulated in the photoelectric conversion devices than the reset is discharged, an electronic shutter state, and a charge state in which the electric charge is accumulated in the photoelectric conversion devices.

According to the embodiments of the present disclosure, it is possible to appropriately suppress blooming of electric charge while suppressing an increase in circuit size, and thereby it is possible to perform high-speed readout.

DETAILED DESCRIPTION

Hereinafter, embodiments of the present disclosure will be described with reference to the accompanying drawings.

In addition, a description will be given in order of the following items.

1. First Embodiment (First Exemplary Configuration of CMOS Image Sensor (Solid-State Imaging Device))
2. Second Embodiment (Second Exemplary Configuration of CMOS Image Sensor (Solid-State Imaging Device))
3. Third Embodiment (Third Exemplary Configuration of CMOS Image Sensor (Solid-State Imaging Device))
4. Fourth Embodiment (Exemplary Configuration of Camera System)

<1. First Embodiment>

Figure 1:
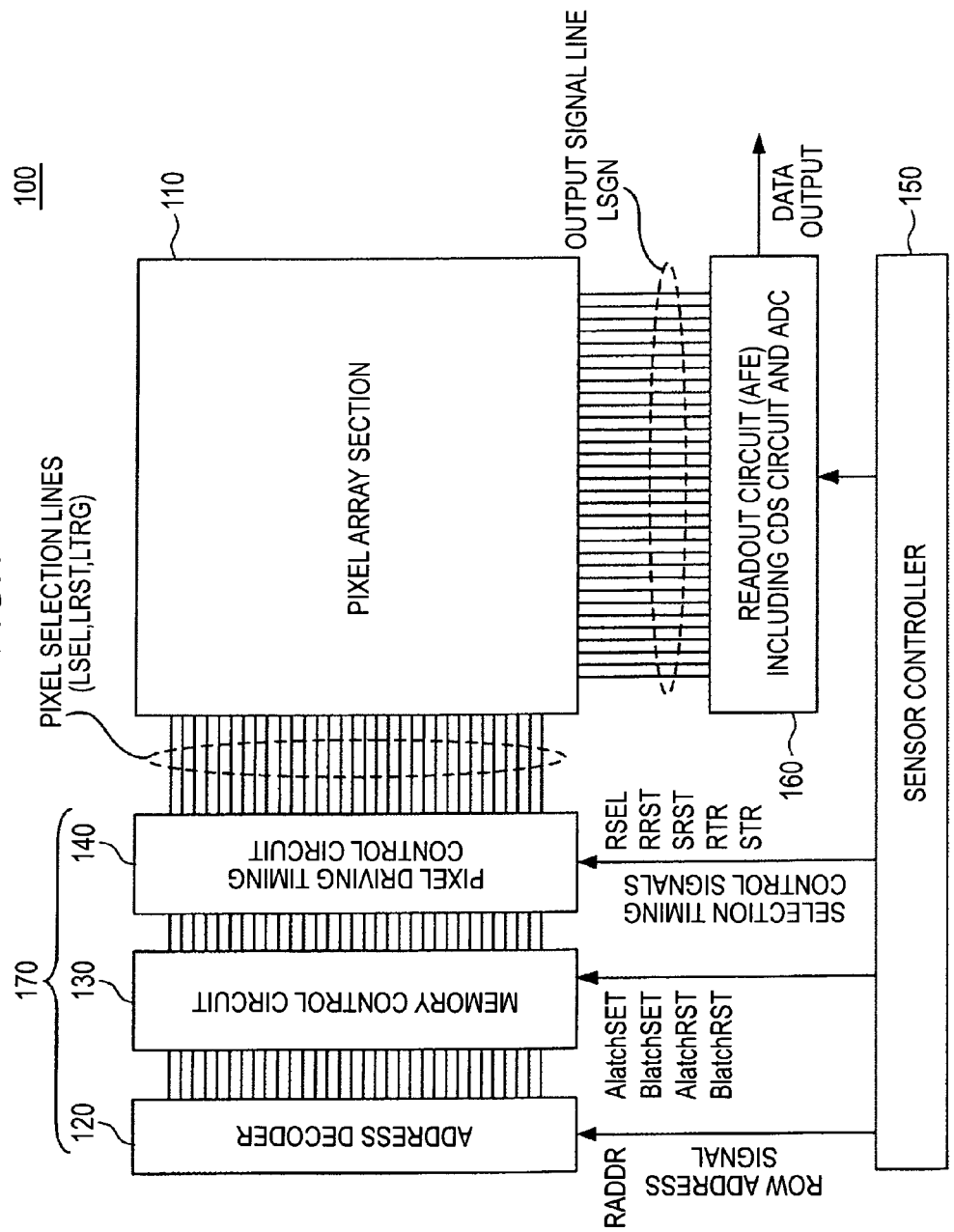
FIG. 1 is a diagram illustrating an exemplary configuration of a CMOS image sensor (solid-state imaging device) according to a first embodiment of the present disclosure.

FIG. 1 is a diagram illustrating an exemplary configuration of a CMOS image sensor (solid-state imaging device) according to a first embodiment of the present disclosure.

A CMOS image sensor 100 has a pixel section 110, an address decoder 120, a latch (memory) control circuit 130, a pixel driving timing control circuit 140, a sensor controller 150, and a readout circuit (AFE) 160.

The address decoder 120, the memory control circuit 130, the pixel driving timing control circuit 140, and the sensor controller 150 constitute a pixel driving section.

In the embodiment, the address decoder 120, the memory control circuit 130, and the pixel driving timing control circuit 140 constitute a row (vertical) selection circuit 170.

The vertical selection circuit 170 is included in the pixel driving section.

The pixel section 110 includes a plurality of pixel circuits which are arranged in two dimensions (matrix) of M rows×N columns.

Figure 2:
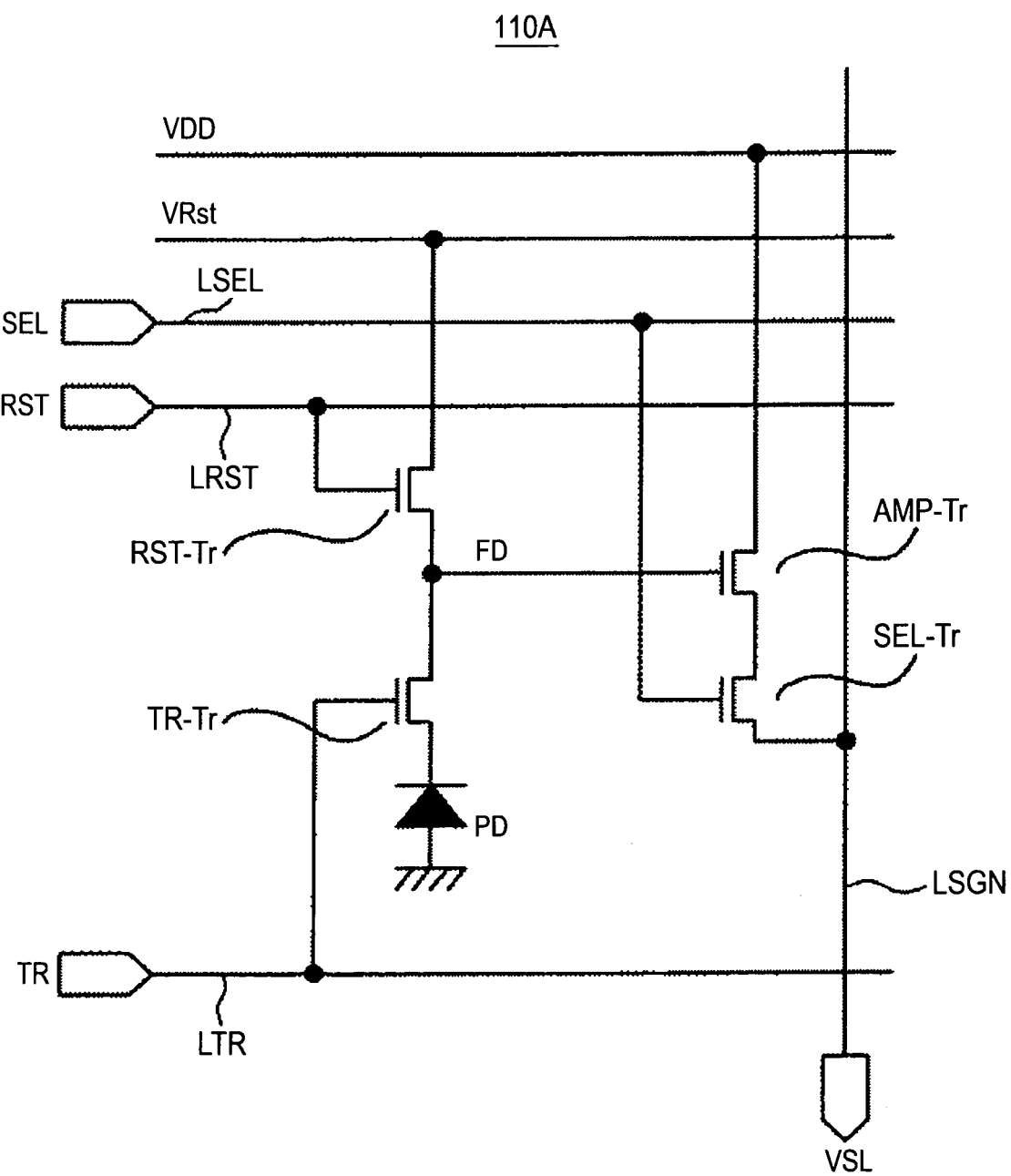
FIG. 2 is a diagram illustrating an example of a pixel circuit according to the embodiment.

FIG. 2 is a diagram illustrating an example of a pixel circuit according to the embodiment.

A pixel circuit 110A includes a photoelectric conversion device (hereinafter sometimes simply referred to as a PD) formed of, for example, a photodiode (PD).

The pixel circuit 110A further includes the following four transistors per photoelectric conversion device PD: a transfer transistor TR-Tr, a reset transistor RST-Tr, an amplifier transistor AMP-Tr, and a selection transistor SEL-Tr.

The photoelectric conversion device PD generates electric charge (here electrons) of which the amount corresponds to the amount of the incident light, and accumulates the electric charge.

Hereinafter, a description will be given under assumption that there are electrons in the signal charge and the respective transistors are N-type transistors. However, the signal charge may be present in holes, or the respective transistors may be P-type transistors.

The gate of the transfer transistor TR-Tr is supplied with a transfer gate control signal TR of which the voltage value is controlled by the pixel driving timing control circuit 140.

The gate of the reset transistor RST-Tr is supplied with a reset gate control signal RST of which the voltage value is controlled by the pixel driving timing control circuit 140.

The gate of the selection transistor SEL-Tr is supplied with a select control signal SEL of which the voltage value is controlled by the pixel driving timing control circuit 140.

The respective transistors may be formed as N-type transistors. In this case, for example, the transfer transistor TR-Tr is put into a perfectly conductive (ON) state when the voltage level of the control signal supplied to the gate thereof is a first level voltage VHi, for example, 2.7 V.

In addition, the transfer transistor TR-Tr is put into a perfectly non-conductive (OFF) state when the voltage level of the control signal supplied to the gate thereof is a second level voltage VLo, for example, −1.2 V.

In addition, the transfer transistor TR-Tr is put into an intermediate conductive (ON) state when the voltage level of the control signal supplied to the gate thereof is a middle voltage Vmid, for example, 0 V between the first level voltage VHi and the second level voltage VLo.

Here, the intermediate conductive state is defined as a state with a lower charge-transfer ability than the perfectly conductive state. For example, when the middle voltage Vmid is applied to the gate of the transfer transistor TR-Tr, the transistor is put into the above-mentioned discharge state.

In addition, the embodiment is also effective in a case where the respective transistors are shared among a plurality of photoelectric conversion devices or in a case where three-transistor (3Tr) pixels each of which do not have a selection transistor are employed.

The transfer transistor TR-Tr is connected between the photoelectric conversion device PD and the FD (Floating Diffusion), and is controlled through a control line LTR.

The transfer transistor TR-Tr is put into the perfectly conductive state by selecting the transfer gate control signal TR, which is transmitted through the control line LTR, during a period of the first level voltage VHi which is a high level, and the photoelectric conversion device PD transfers the photoelectrically converted electrons to the FD.

The transfer transistor TR-Tr is put into the intermediate conductive state by selecting the transfer gate control signal TR, which is transmitted through the control line LTR, during a period of the middle voltage Vmid, and the photoelectric conversion device PD discharges the photoelectrically converted electrons to the FD.

The reset transistor RST-Tr is connected between a power source line LVRst and the FD, and is controlled through a control line LRST.

The reset transistor RST-Tr is put into the conductive state by selecting the reset control signal RST, which is transmitted through the control line LRST, during for example the period of VHi, and resets the FD to the electric potential VRst of the power source line LVRst.

The amplifier transistor AMP-Tr and the selection transistor SEL-Tr are connected in series between a power source line LVDD and an output signal line VSL.

The gate of the amplifier transistor AMP-Tr is connected to the FD, and the selection transistor SEL-Tr is controlled through the control line LSEL.

The selection transistor SEL-Tr is put into the conductive state by selecting the select control signal SEL, which is transmitted through the control line LSEL, during a period of VHi. Thereby, the amplifier transistor AMP-Tr outputs the signal VSL corresponding to the electric potential of the FD to the output signal line LSGN.

In the pixel section 110, the pixel circuits 110A are disposed in an array with M rows×N columns. Therefore, the number of each control line LSEL, LRST, and LTR is M, and the number of output signal line LSGN of the signal VSL is N.

The vertical selection circuit 170 has an address decoder 120 which selects the address in the vertical (row) direction.

The vertical selection circuit 170 has the memory control circuit 130 that controls a memory (latch) state on the basis of combinational logic between the control signal and the output signal of the address decoder and determines each row state through the logic operation of the output values thereof.

The vertical selection circuit 170 has the pixel driving timing control circuit 140 that is a pixel driver for controlling the reset transistor (switch) RST-Tr and the transfer transistor (switch) TR-Tr of each pixel by using the state signal of the memory control circuit 130.

Figure 3:
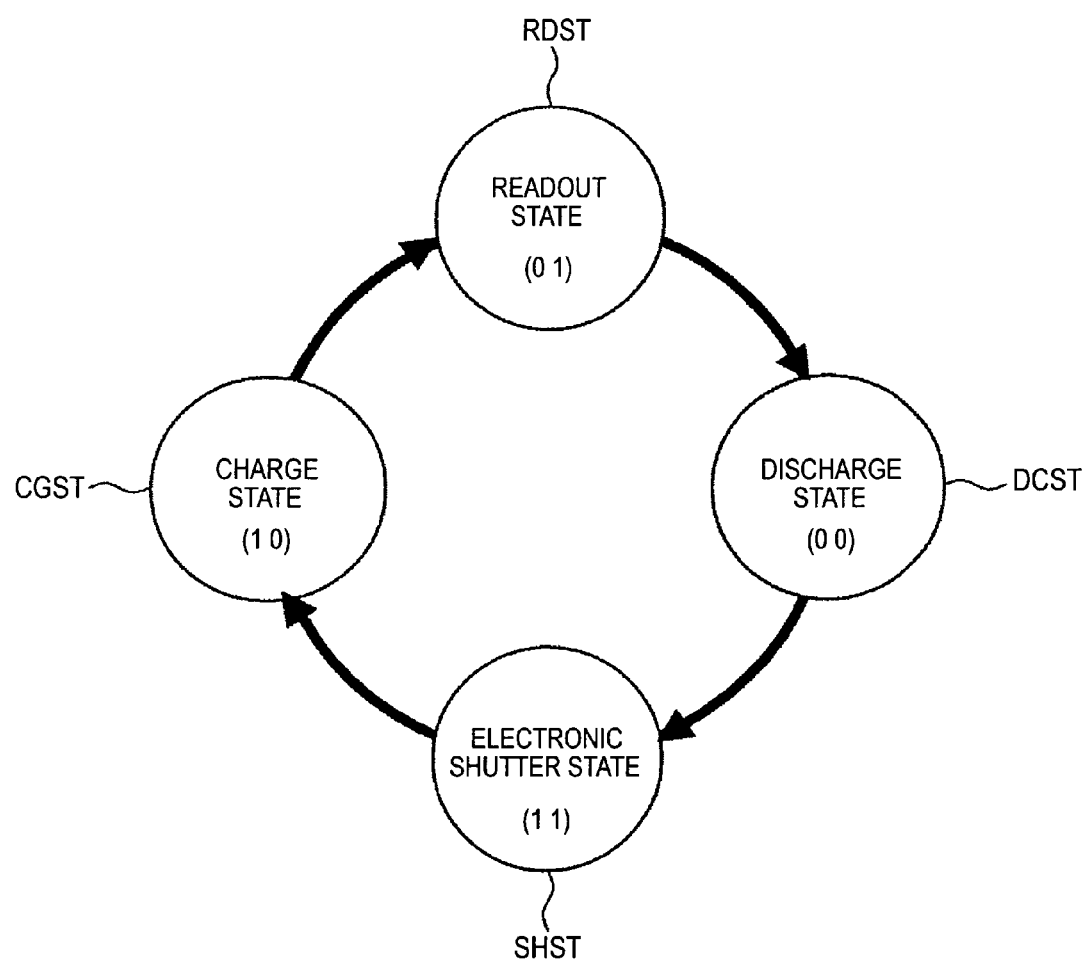
FIG. 3 is a diagram illustrating four states of a pixel according to the first embodiment and an example of a transition relationship thereof.

FIG. 3 is a diagram illustrating four states of a pixel according to the first embodiment and an example of a transition relationship thereof.

In the embodiment, the vertical selection circuit 170, which is a part of the pixel driving section, is configured to be able to control the pixel state of the row, which is designated by the row (vertical) address decoded through the address decoder 120, in the four states as shown in FIG. 3.

The four states include, as shown in FIG. 3, a readout state RDST, a discharge state DCST, an electronic shutter state SHST, and a charge state CGST.

In addition, the control is performed such that the four states sequentially transition from one to another.

In the first embodiment, the memory control circuit 130 has memories (A, B) which are two latches, and the four states are set by a combination between the set states (1) and the reset states (0) of the two memories, thereby controlling the memories.

In the readout state RDST, the memories (A, B) are set to (0, 1), and in the discharge state, the memories (A, B) are set to (0, 0).

In the electronic shutter state SHST, the memories (A, B) are set to (1, 1), and in the charge state CGST, the memories (A, B) are set to (1, 0).

Here, a description is given of a case where state assignment is performed such that each state is represented by binary digits in order of the first memory (A memory) 131 and the second memory (B memory) 132.

In the first embodiment, the addresses of the readout row and shutter row are switched for each unit of the horizontal scanning period.

Normally, the readout row is shifted from the readout state RSDT and set to the discharge state DCST, and the electronic shutter row is shifted from the electronic shutter state SHST and set to the charge state CGST. Then, sequentially, the readout state is set, and the electronic shutter state is set such that a prescribed exposure time is set.

Figure 4:
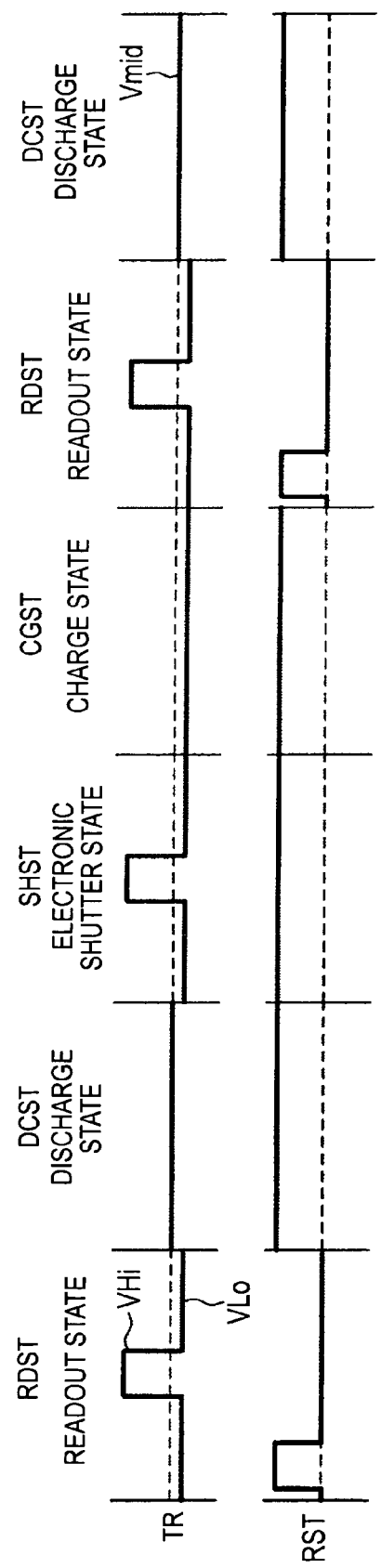
FIG. 4 is a diagram schematically illustrating supply levels corresponding to four states of each of a transfer gate control signal and a reset gate control signal which are supplied to the pixel circuit in the first embodiment.

FIG. 4 is a diagram schematically illustrating supply levels corresponding to four states of each of the transfer gate control signal TR and the reset gate control signal RST which are supplied to the pixel circuit 110A in the first embodiment.

In this example, in the readout state RDS, the reset gate control signal RST is set to a high level during a certain period. During this period, the transfer gate control signal TR is set to the second level voltage VLo, and is controlled to be in the perfectly non-conductive state.

Then, after the reset gate control signal RST is set to a low level, the transfer gate control signal TR is set to the first level voltage VHi during a certain period, thereby performing the readout.

Next, in the case of transition to the discharge state DCST, the transfer gate control signal TR is set to the middle voltage Vmid during a certain period, and the reset gate control signal RST is set to a high level, whereby the signal is held in the conductive state. Thereby, discharge of electric charge is performed.

The reset gate control signal RST is held at a high level throughout the discharge state DCST, the electronic shutter state SHST, and the charge state CGST.

When transition from the discharge state DCST to the electronic shutter state SHST is made, the transfer gate control signal TR changes from the middle voltage Vmid to the second level voltage VLo. Then, when the electronic shutter is executed, the transfer gate control signal TR changes from the middle voltage Vmid to the first level voltage VHi during a certain period, thereby controlling the transfer transistor TR-Tr such that it is put into the perfectly conductive state.

Then, the transfer gate control signal TR changes from the first level voltage VHi to the second level voltage VLo, thereby transitioning to the charge state CGST.

As described above, in the first embodiment, the pixel states are controlled to transition from one to another in order of the readout state RDST, discharge state DCST, the electronic shutter state SHST, and the charge state CGST. As a result, while suppressing an increase in circuit size, it is possible to appropriately suppress blooming of electric charge.

Figure 5:
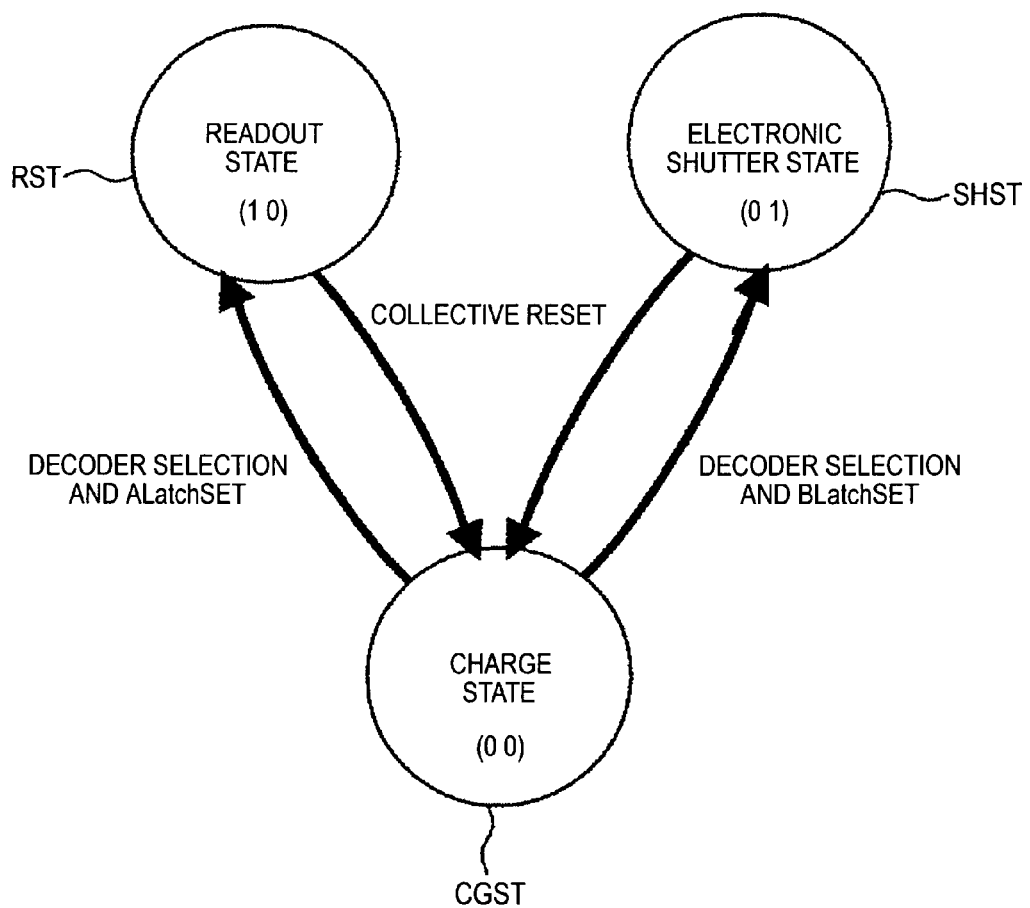
FIG. 5 is a diagram illustrating pixel states of a generic CMOS image sensor and a transition relationship thereof.

FIG. 5 is a diagram illustrating pixel states of a generic CMOS image sensor and a transition relationship thereof.

As shown in the drawing, the generic CMOS image sensor performs a three-state transition control of the transition between the charge state CGST and the readout state RDST and the transition between the charge state CGST and the electronic shutter state SHST.

Accordingly, it is difficult to appropriately and sufficiently suppress blooming of electric charge.

Hereinafter, a description will be given of a specific exemplary configuration in which the four states of the vertical (row) selection circuit 170 according to the first embodiment are collectively controlled.

Further, the memory (latch) control circuit 130 and the pixel driving timing control circuit 140 having characteristic configurations will be described with reference to a specific example.

The address decoder 120 decodes a row address signal RADDR transmitted from the sensor controller 150, and selects a specific row.

Figure 6:
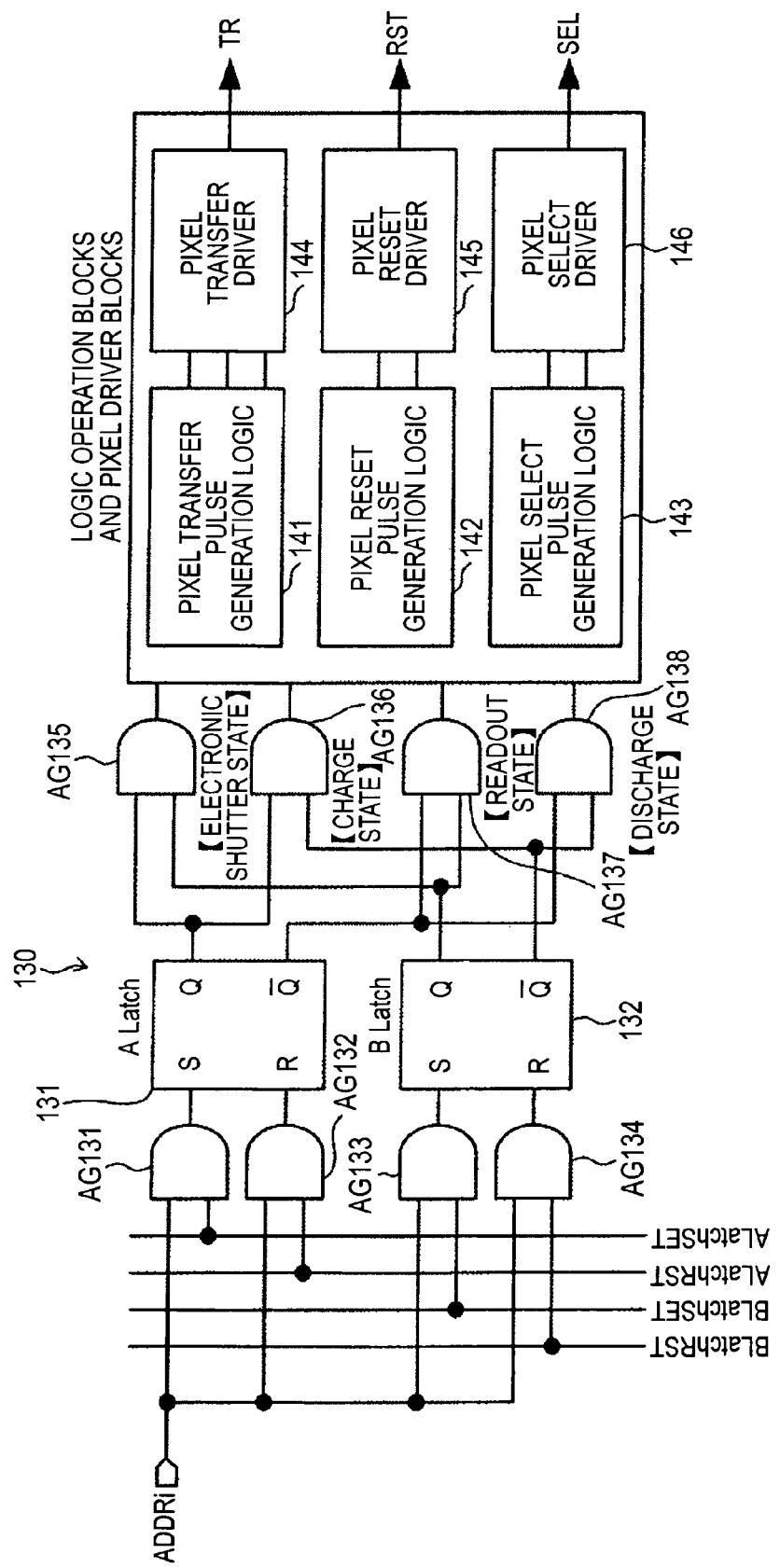
FIG. 6 is a diagram illustrating an example of a pixel driving timing control circuit and a memory control circuit of a vertical (row) selection circuit according to the first embodiment.

FIG. 6 is a diagram illustrating an example of the pixel driving timing control circuit and the memory control circuit of the vertical (row) selection circuit according to the first embodiment.

The memory control circuit 130 of FIG. 6 has 2-input AND gates AG131 to AG138, a first memory (A memory) 131, and a second memory (B memory) 132.

The memory control circuit 130 is supplied, from the sensor controller 150, with an A-memory (latch) set control signal ALatchSET and an A-memory (latch) reset control signal ALatchRST.

The memory control circuit 130 is supplied, from the sensor controller 150, with a B-memory (latch) set control signal BLatchSET and a B-memory (latch) reset control signal BLatchRST.

One input terminal of each of the AND gates AG131 to AG134 are supplied with an output signal ADDRi of the address decoder 120.

The other input terminal of the AND gate AG131 is supplied with the A-memory (latch) set control signal ALatchSET, and the other input terminal of the AND gate AG132 is supplied with the A-memory (latch) reset control signal ALatchRST.

The other input terminal of the AND gate AG133 is supplied with the B-memory (latch) set control signal BLatchSET, and the other input terminal of the AND gate AG134 is supplied with the B-memory (latch) reset control signal BLatchRST.

A set terminal S of the first memory (A memory) 131 is connected to the output of the AND gate AG131, and a reset terminal R thereof is connected to the output of the AND gate AG132.

An output terminal Q of the first memory (A memory) 131 is connected to each of the input terminals of the AND gates AG135 and AG136, and an inverted output terminal $\overline{Q}$ thereof is connected to each of the input terminals of the AND gates AG137 and AG138.

A set terminal S of the second memory (B memory) 132 is connected to the output of the AND gate AG133, and a reset terminal R thereof is connected to the output of the AND gate AG134.

An output terminal Q of the second memory (B memory) 132 is connected to each one input terminal of the AND gates AG135 and AG137, and an inverted output terminal $\overline{Q}$ thereof is connected to each of the other input terminals of the AND gates AG136 and AG138.

The output of the AND gate AG135 is a control signal of the electronic shutter state SHST, and the output of the AND gate AG136 is a control signal of the charge state CGST.

The output of the AND gate AG137 is a control signal of the readout state RDST, and the output of the AND gate AG138 is a control signal of the discharge state DCST.

As described above, in the first embodiment, the memory control circuit 130 has memories (A, B) which are two latches, and the four states are set by the combination between the set states (1) and the reset states (0) of the two memories, thereby controlling the memories.

In the readout state RDST, the memories (A, B) are set to (0, 1), and in the discharge state, the memories (A, B) are set to (0, 0).

In the electronic shutter state SHST, the memories (A, B) are set to (1, 1), and in the charge state CGST, the memories (A, B) are set to (1, 0).

It should be noted that the present disclosure is not limited to only the memory state assignment described in the embodiment.

In the memory control circuit 130, the first memory (A memory) 131 is set by logical product between the output of the address decoder 120 and the A-memory (latch) set control signal ALatchSET of the sensor controller 150.

The first memory (A memory) 131 is reset by the logical product between the output of the address decoder 120 and the A-memory (latch) reset control signal ALatchRST of the sensor controller 150.

In the memory control circuit 130, the second memory (B memory) 132 is set by the logical product between the output of the address decoder 120 and the B-memory (latch) set control signal BLatchSET of the sensor controller 150.

The second memory (B memory) 132 is reset by the logical product between the output of the address decoder 120 and the B-memory (latch) reset control signal BLatchRST of the sensor controller 150.

The pixel driving timing control circuit 140 performs the following processing in a pixel transfer pulse generation circuit 141, a pixel reset pulse generation circuit 142, and a pixel select pulse generation circuit 143.

On the basis of the combination between the output signal of the first memory (A memory) 131 and the output signal of the second memory (B memory) 132, three or more combinational logic operations of (A·B), (notA·B), (A·notB), and (notA·notB) are performed.

Then, through a pixel transfer driver 144, a pixel reset driver 145, and a pixel select driver 146, pixel control signals corresponding to assignment of the respective logic operations are generated as pulse signals.

Furthermore, the first embodiment is also effective for a method of directly generating four states through logical product from two outputs of the first memory (A memory) 131 and the second memory (B memory) 132 in the vertical (row) selection circuit 170.

For example, a logic circuit, which generates the three states of (A·B), (notA·B), and (notA·notB), is equivalent to the pixel control signals which control four states even in NOR of the three state signals.

Figure 7:
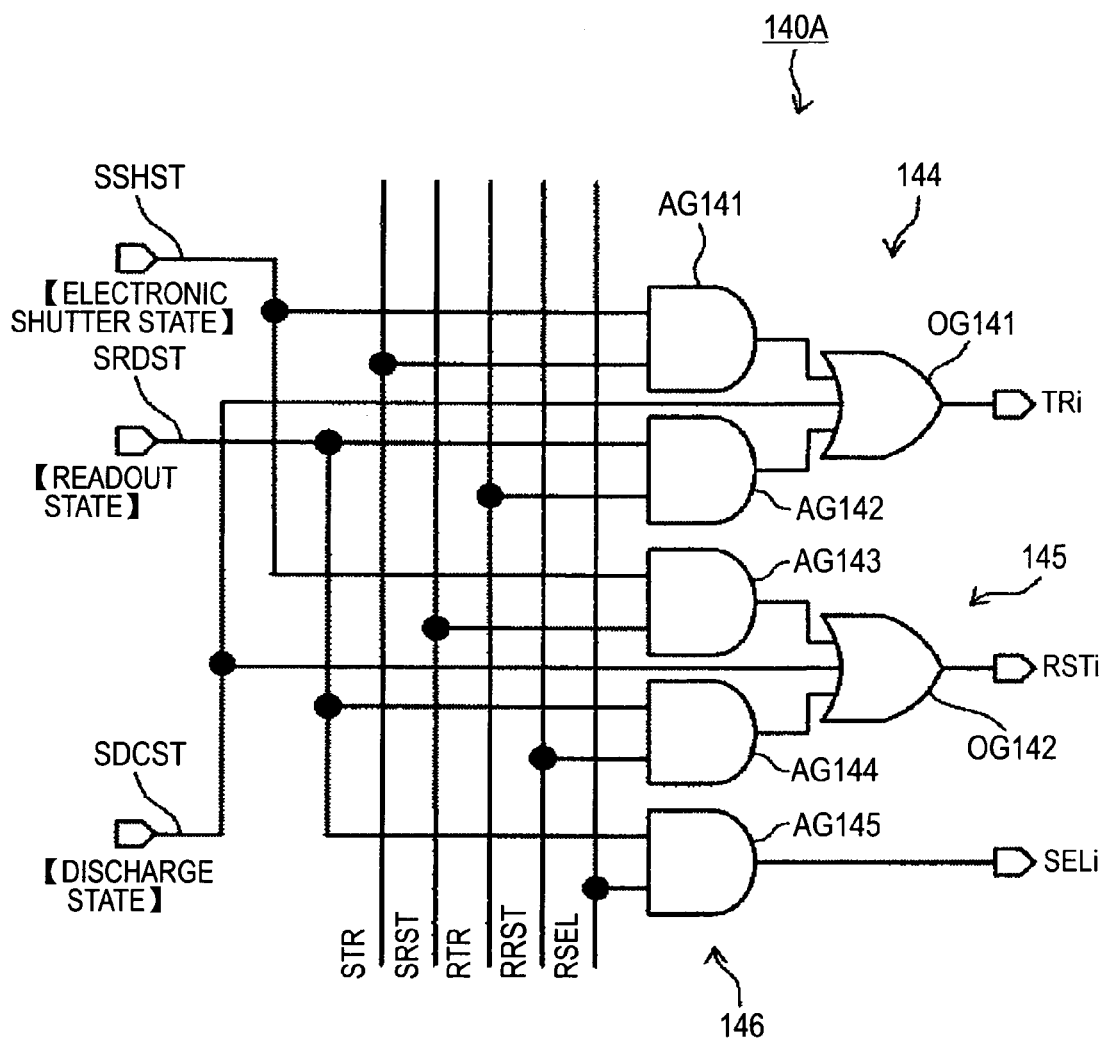
FIG. 7 is a circuit diagram illustrating an exemplary configuration of a pixel driver of the pixel driving timing control circuit according to the first embodiment.

FIG. 7 is a circuit diagram illustrating an exemplary configuration of the pixel driver of the pixel driving timing control circuit according to the first embodiment.

FIG. 7 shows a circuit diagram of the pixel control signals, which includes not only two normal signals of the shutter state signal SSHST and the readout state signal SRDST but also the discharge state signal SDCST, for controlling the four states.

In FIG. 7, the pixel transfer driver 144 is formed of 2-input AND gates AG141 and AG142 and a 3-input OR gate OG141.

The pixel transfer driver 145 is formed of 2-input AND gates AG143 and AG144 and a 3-input OR gate OG142.

The pixel transfer driver 146 is formed of a 2-input AND gate AG145.

The pixel transfer driver 144 outputs the transfer gate control signal TR of each pixel.

The pixel transfer driver 144 performs, in the AND gate AG141, AND (logical product) between the readout state signal SRDST and the pixel transfer control signal RTR for readout performed by the sensor controller 150.

The pixel transfer driver 144 performs, in the AND gate AG142, AND (logical product) between the shutter state signal SSHST and the pixel transfer control signal (ST) for shutter performed by the sensor controller 150.

Then, the pixel transfer driver 144 performs control on the basis of OR (logical sum) which is performed in the OR gate OG141 on the three signals of the AND results of the AND gates AG141 and AD142 and the discharge state signal SDCST.

The pixel reset driver 145 outputs the reset gate control signal RST of each pixel.

The pixel reset driver 145 performs, in the AND gate AG143, AND between the readout state signal SRDST and the pixel reset control signal RRST for readout performed by the sensor controller 150.

The pixel reset driver 145 performs, in the AND gate AG144, AND between the shutter state signal SSHST and the pixel reset control signal SRST for shutter performed by the sensor controller 150.

The pixel reset driver 145 performs control on the basis of OR (logical sum) which is performed in the OR gate OG142 on the three signals of the AND results of the AND gates AG143 and AD144 and the discharge state signal SDCST.

The pixel select driver 146 outputs the select control signal SEL of each pixel.

The pixel select driver 146 performs control on the basis of AND which is performed in the AND gate AG145 on the readout state signal SRDST and the pixel select control signal RSEL for readout performed by the sensor controller 150.

Figure 8:
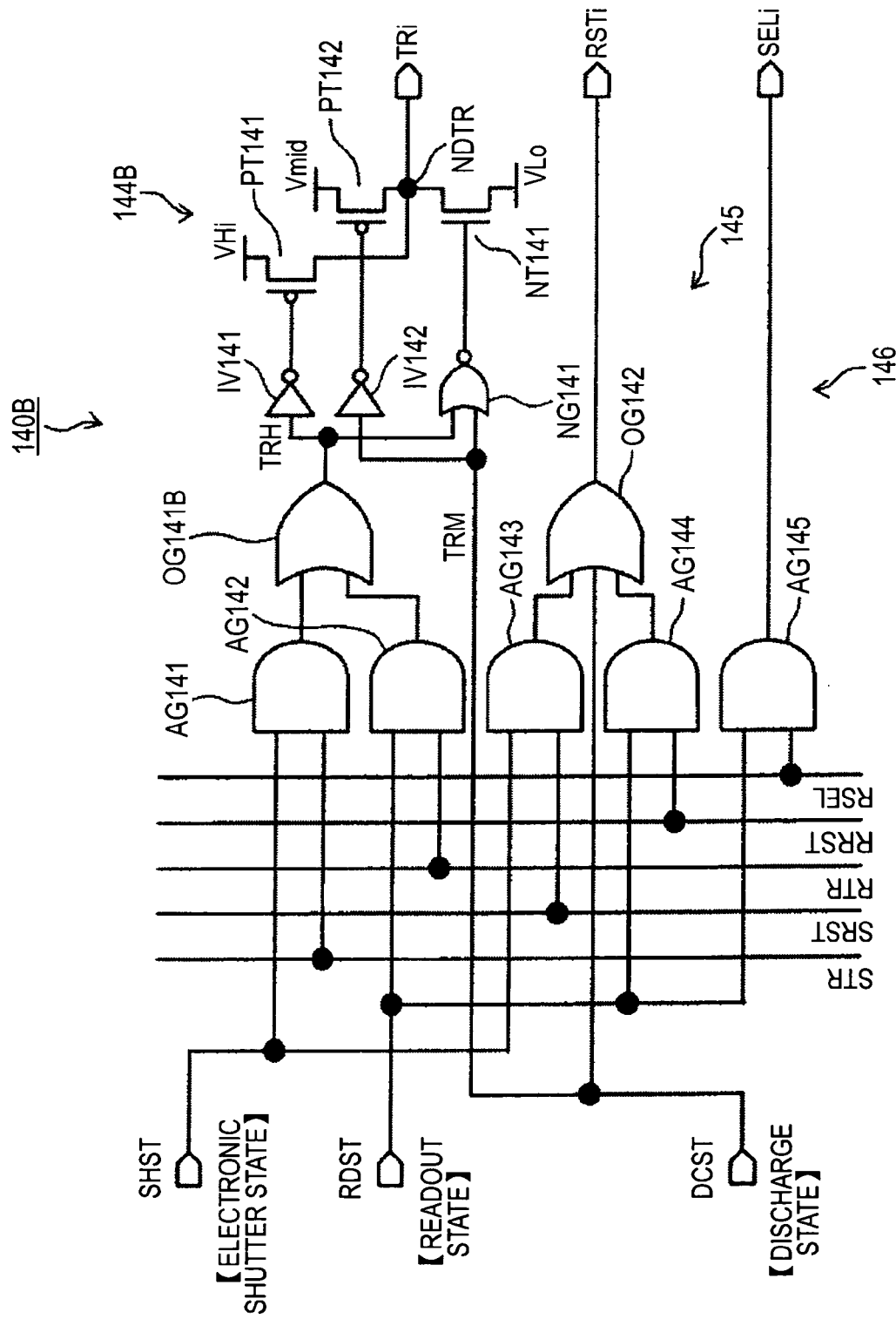
FIG. 8 is a circuit diagram illustrating another exemplary configuration of the pixel driver of the pixel driving timing control circuit according to the first embodiment.

FIG. 8 is a circuit diagram illustrating another exemplary configuration of the pixel driver of the pixel driving timing control circuit according to the first embodiment.

The pixel driver of FIG. 8 is different from the pixel driver of FIG. 7 in the following respects.

As described above, the transfer transistor TR-Tr of each pixel according to the first embodiment has three states of the perfectly conductive state, the perfectly non-conductive state, and the intermediate conductive state at the time of the discharge state.

The respective transistors may be formed as N-type transistors. In this case, for example, the transfer transistor TR-Tr is put into a perfectly conductive (ON) state when the voltage level of the control signal supplied to the gate thereof is a first level voltage VHi, for example, 2.7 V.

In addition, the transfer transistor TR-Tr is put into a perfectly non-conductive (OFF) state when the voltage level of the control signal supplied to the gate thereof is a second level voltage VLo, for example, −1.2 V.

In addition, the transfer transistor TR-Tr is put into an intermediate conductive (ON) state when the voltage level of the control signal supplied to the gate thereof is a middle voltage Vmid, for example, 0 V between the first level voltage VHi and the second level voltage VLo.

In the pixel driver of FIG. 8, the pixel transfer driver 144B is formed as a 3-valued output driver.

The pixel transfer driver 144B of FIG. 8 has AND gates AG141 and AG142, a 2-input OR gate OG141B, a 2-input NOR gate NG141, and inverters IV141 and IV142.

Further, the pixel transfer driver 144B has PMOS transistors PT141 and PT142, an NMOS transistor NT141, and an output node NDTR.

One input of the OR gate OG141B is connected to the output of the AND gate AG141, and a pixel-complete-transfer control signal TRH is output from the OR gate OG141B.

One input of the NOR gate NG141 is connected to the output of the OR gate OG141B, and the output of the NOR gate NG141 is connected to the gate of the NMOS transistor NT141.

The input of the inverter IV141 is connected to the output of the OR gate OG141, and the output of the inverter IV141 is connected to the gate of the PMOS transistor PT141.

The input of the inverter IV142 is connected to the supply line of the discharge state signal SDCVST (TRM), and the output thereof is connected to the gate of the PMOS transistor PT142.

The source of the PMOS transistor PT141 is connected to the supply line of the first level voltage VHi, and the drain thereof is connected to the output node NDTR.

The gate of the PMOS transistor PT142 is connected to the supply line of the middle voltage Vmid, and the drain thereof is connected to the output node NDTR.

The source of the NMOS transistor NT141 is connected to the supply line of the second level voltage VLo, and the drain thereof is connected to the output node NDTR.

As described above, the transfer transistor (switch) TR-Tr of each pixel in the discharge state DCST may be in the intermediate conductive state (a half-open state).

In this case, for the transfer gate control signal TR of each pixel, 3-valued control is necessary.

In the example of FIG. 8, the pixel transfer driver using two PMOSs and one NMOS is shown. Other than the above, a configuration using one PMOS and two NMOSs may be adopted.

In the pixel transfer driver 144B of FIG. 8, the pixel-complete-transfer control signal TRH is controlled by AND between the readout state signal SRDST and the pixel transfer control signal RTR for readout and AND between the shutter state signal SSHST and the pixel transfer control signal STR for shutter.

The pixel intermediate transfer control signal TRM is controlled by the discharge state signal SDCST.

On the basis of two signals of the pixel-complete-transfer control signal TRH and the pixel intermediate transfer control signal TRM, the output of the pixel 3-valued control driver circuit is controlled.

For example, in the discharge state DC, when the discharge signal SDCST is at a high level, the PMOS transistor PT142 is put into the conductive state, and the PMOS transistor PT141 and the NMOS transistor NT141 are put into the non-conductive state. As a result, the transfer gate control signal TR is output at a level of the middle voltage Vmid.

In the readout state RDST or in the electronic shutter state SHST, the PMOS transistor PT142 is held in the non-conductive state, one of the PMOS transistor PT141 and the NMOS transistor NT141 is held in the conductive state, and the other thereof is held in the non-conductive state.

The pixel reset driver 145 and the pixel select driver 146 of FIG. 8 has the same function as the circuit of FIG. 7.

Figure 9:
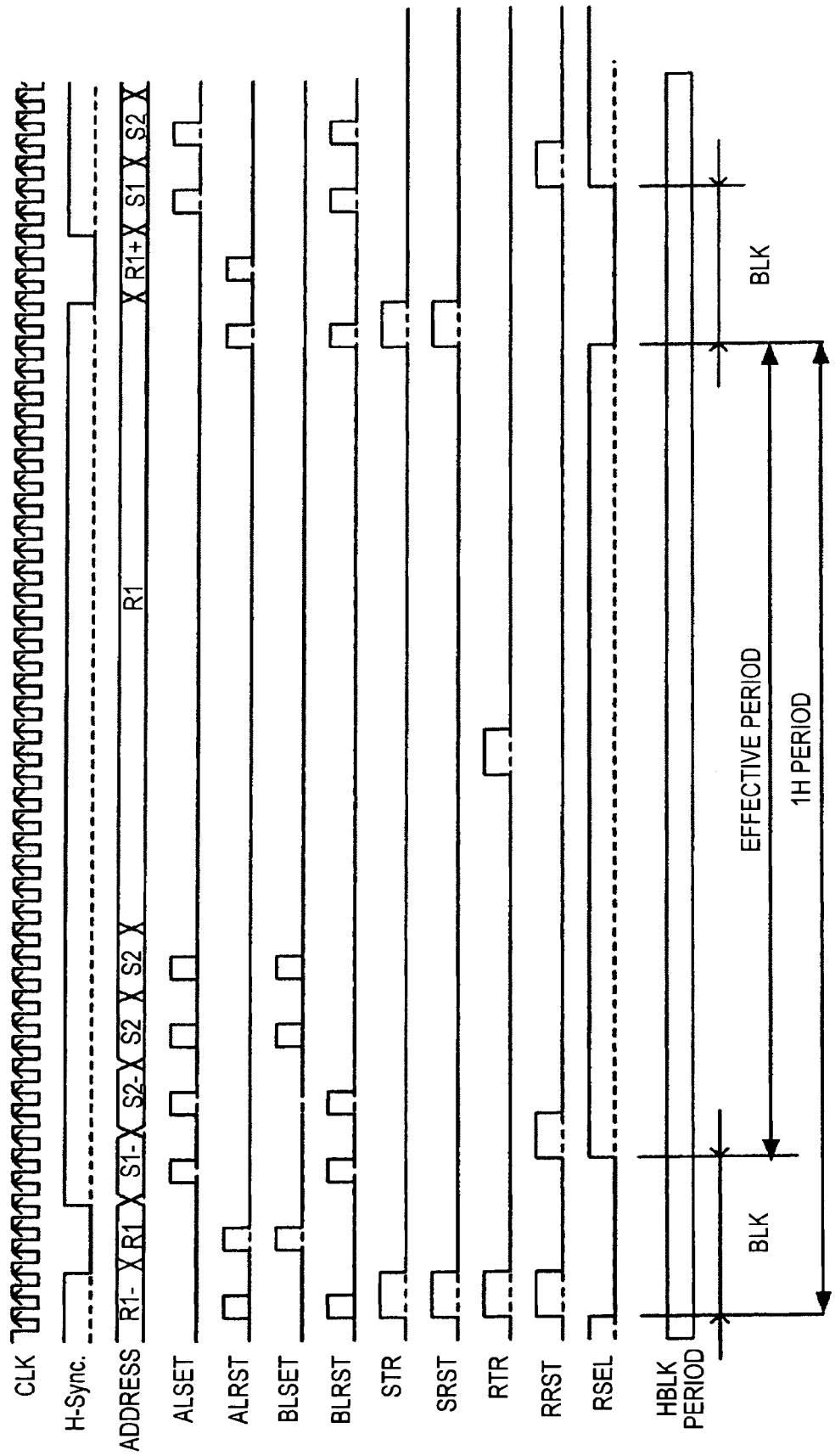
FIG. 9 is a diagram illustrating a timing chart with a focus on operations of the vertical (row) selection circuit according to the first embodiment.

FIG. 9 is a diagram illustrating a timing chart with a focus on operations of the vertical (row) selection circuit according to the first embodiment.

Figure 10:
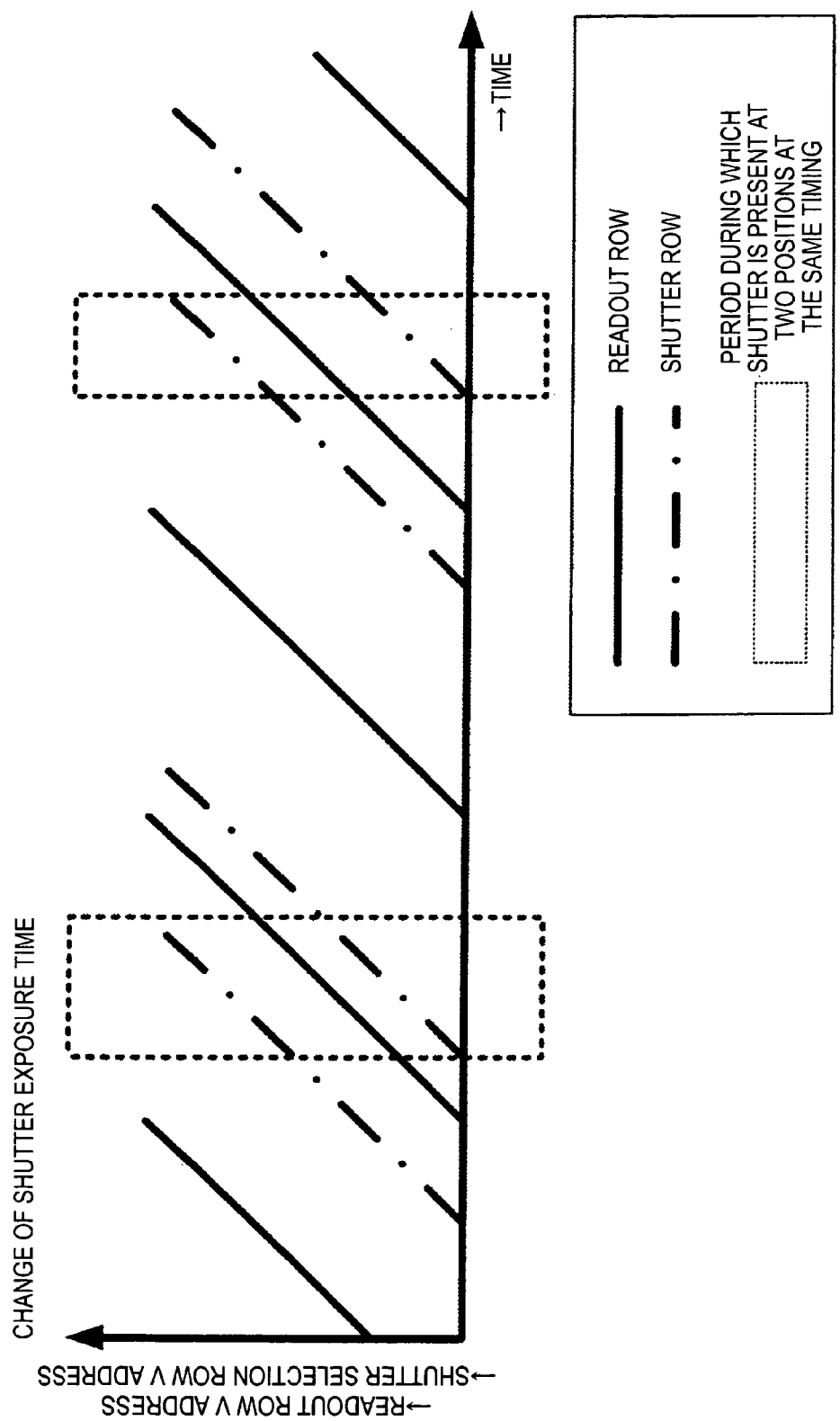
FIG. 10 is a diagram illustrating a case where an electronic shutter generates addresses corresponding to two rows at the same timing when an exposure time is longer that that of a previous frame.

FIG. 10 is a diagram illustrating a case where an electronic shutter generates addresses corresponding to two rows at the same timing when an exposure time is longer that that of a previous frame.

In the timing chart of FIG. 9, as shown in FIG. 10, when an exposure time is longer that that of a previous frame, the electronic shutter generates addresses corresponding to two rows at the same timing. This case is described herein.

The addresses of the readout row and the shutter row are switched for each unit of the horizontal scanning period.

Normally, the readout row is shifted from the readout state RDST and set to the discharge state DCST, and the electronic shutter row is shifted from the electronic shutter state SHST and set to the charge state CGST. Then, sequentially, the readout state is set, and the electronic shutter state is set such that a prescribed exposure time is set.

The timing chart shown in FIG. 9 is an example of the above-mentioned case, and the writing sequence to the memories (latches) is not essential.

However, it is preferable that the sequence of change of the row representing the readout state RDST should be successively set in order to shorten the horizontal scanning period in terms of an increase in speed of readout.

In the first embodiment, after completion of readout operation, the row, which was set to the readout state, is reset to the discharge state (A memory (latch)=0, and B memory (latch) =0).

After the decoder address is set in the new readout row, the row is set to the readout state (A memory=0, and B memory=1).

Since an effective period begins after the completion of the operation, the readout operation may be started even before completion of the resetting of the electronic shutter row.

The resetting of the subsequent electronic shutter row is performed. In the drawing, "S1-" and "S2-", which were set as the shutter rows during the previous horizontal scanning period, are changed to the charge state, and "S1" and "S2" are newly reset to the electronic shutter state SHST.

As an example of the timing chart, after the decoder address is set in "S1-", "S1-" is set to the charge state (A memory=1, and B memory=0) CGST.

Likewise, the decoder address is set in "S2-", and "S2-" is set to the charge state CGST.

Next, the address "S1", at which the electronic shutter operation is performed, is selected as the decoder address, and the A memory and the B memory are set to the electronic shutter state (A memory=1, and B memory=1) SHST.

Thereafter, the same setting is also performed on "S2".

<2. Second Embodiment>

Figure 11:
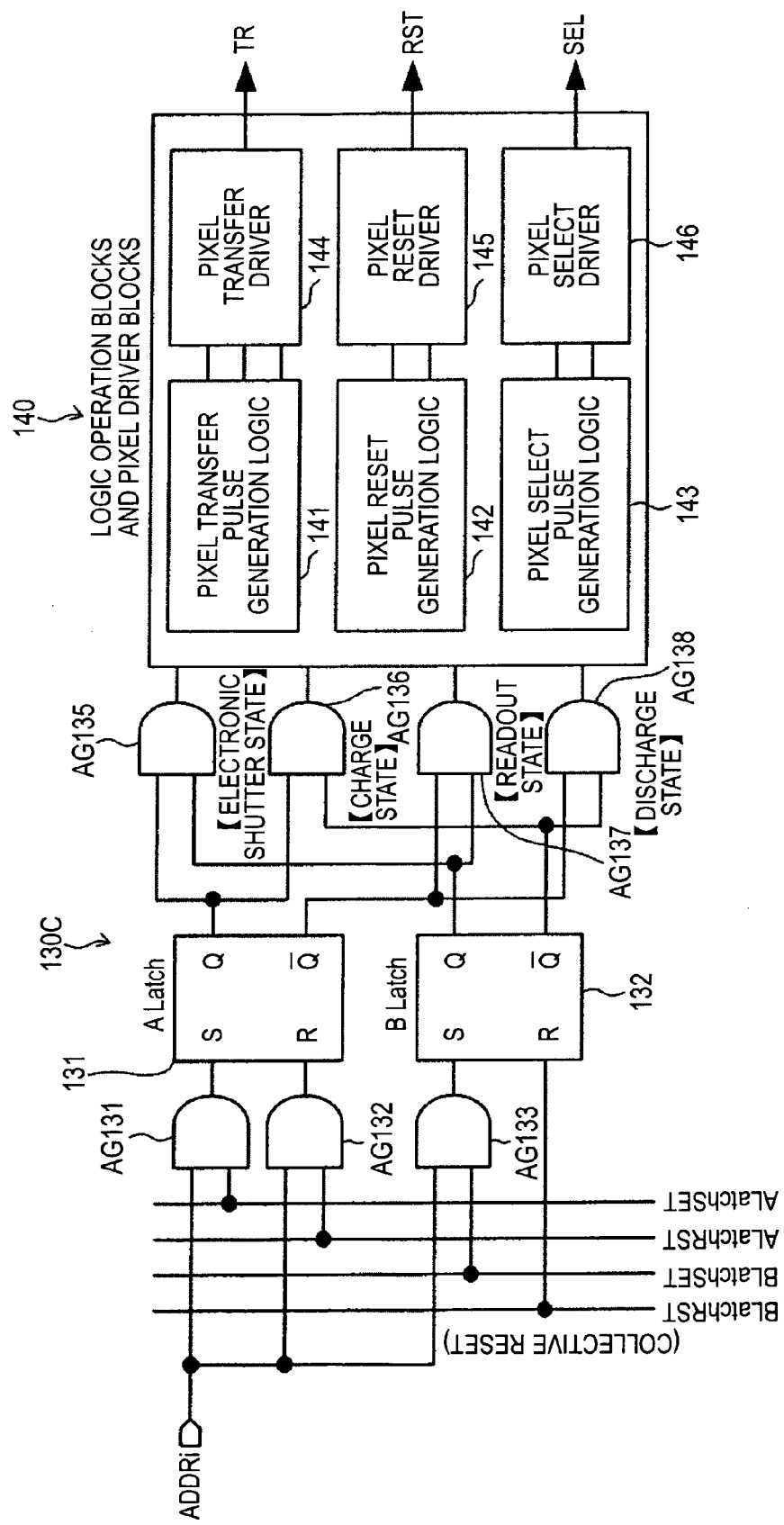
FIG. 11 is a diagram illustrating an example of a pixel driving timing control circuit and a memory control circuit of a vertical (row) selection circuit in a CMOS image sensor (the solid-state imaging device) according to a second embodiment.

FIG. 11 is a diagram illustrating an example of a pixel driving timing control circuit and a memory control circuit of a vertical (row) selection circuit in a CMOS image sensor (the solid-state imaging device) according to a second embodiment.

In the second embodiment, the circuit configuration is substantially the same as that of the first embodiment.

Accordingly, the pixel driver and the like adopt the same configuration as those in FIG. 7 or 8.

The second embodiment is different from the above-mentioned first embodiment in the following respects. As shown in FIG. 11, the second memory (B memory) 132 of each row is integrally reset by the B-memory (latch) reset control signal BLatchRST.

In the memory control circuit 130C of FIG. 11, the AND gate AG134 is not disposed at the input stage of the reset terminal R of the second memory (B memory) 132, and the B-memory (latch) reset control signal BLatchRST is directly supplied.

With such a configuration, an increase in speed is achieved.

In the second embodiment, also similarly to the first embodiment, the vertical selection circuit 170, which is a part of the pixel driving section, is configured to be able to control the pixel state of the row, which is designated by the row (vertical) address decoded through the address decoder 120, in the four states as shown in FIG. 3.

The four states include, as shown in FIG. 3, a readout state RDST, a discharge state DCST, an electronic shutter state SHST, and a charge state CGST.

In addition, the control is performed such that the four states sequentially transition from one to another.

In the second embodiment, the memory control circuit 130 has memories (A, B) which are two latches, and the four states are set by a combination between the set states (1) and the reset states (0) of the two memories, thereby controlling the memories.

In the readout state RDST, the memories (A, B) are set to (0, 1), and in the discharge state, the memories (A, B) are set to (0, 0).

In the electronic shutter state SHST, the memories (A, B) are set to (1, 1), and in the charge state CGST, the memories (A, B) are set to (1, 0).

Figure 12:
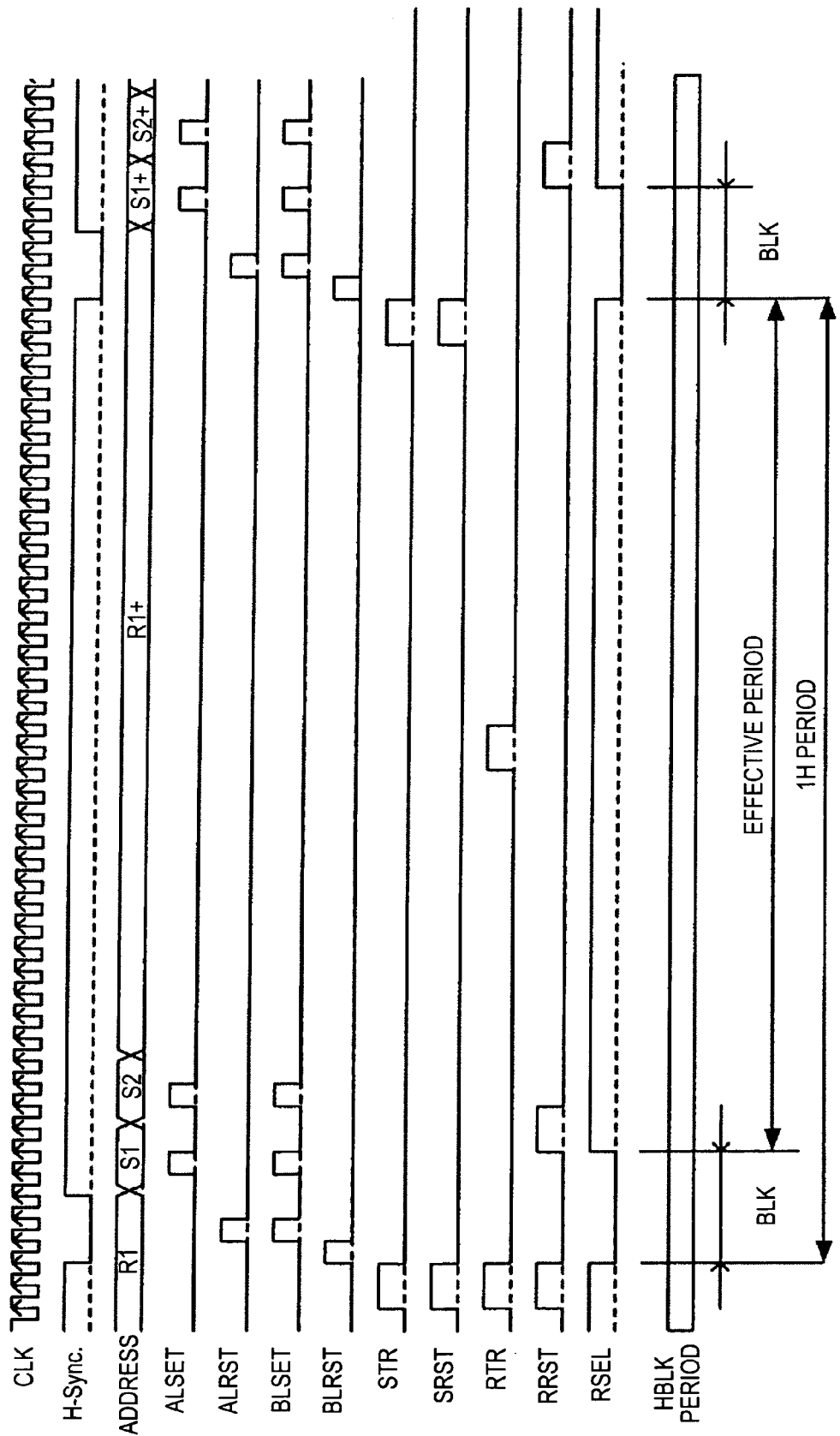
FIG. 12 is a diagram illustrating a timing chart with a focus on operations of the vertical (row) selection circuit according to the second embodiment.

FIG. 12 is a diagram illustrating a timing chart with a focus on operations of the vertical (row) selection circuit according to the second embodiment.

Further in this case, as shown in FIG. 10, when an exposure time is longer that that of a previous frame, the electronic shutter generates addresses corresponding to two rows at the same timing. This case is described herein.

The addresses of the readout row and the shutter row are switched for each unit of the horizontal scanning period.

Normally, there is a characteristic that the readout row transitions to the discharge state DCST in the subsequent horizontal scanning period and the electronic shutter row shifts to the charge state CGST during the subsequent horizontal scanning period.

In the second embodiment, by adopting pixel access timing and a circuit configuration using the characteristic, it is possible to reduce the number of access of the decoder.

As shown in the timing chart of FIG. 11, in the second embodiment, after completion of the readout operation, in order to reset the second memory (B memory) 132, the control signal BLRST is set to a high level.

At this time, (1, 1) state of the first memory (A memory) 131 and the second memory (B memory) 132, that is, the memories (A, B) changes to (1, 0) state. That is, the row of the electronic shutter state SHST shifts (transitions) to the charge state CGST.

(0, 1) state of the memories (A, B) changes to (0, 0) state, that is, the row of the readout state RDST shifts (transitions) to the discharge state.

Thereafter, the decoder is set in the address of the readout row, thereby resetting the first memory (A memory) 131 and setting the second memory (B memory) 132. Then, the row is set to the charge readout state RDST (0, 1) state.

Then, the decoder is set in the address of the electronic shutter row, thereby setting both of the first memory (A memory) 131 and the second memory (B memory) 132 to a high level.

Thereafter, the same electronic shutter state setting is also performed on "S2".

As described above, by using the circuit configuration according to the embodiment of the present disclosure, it is possible to reduce the number of memory settings from the six access operations, which are necessary in the above first embodiment, to three access operations which are necessary in the circuit configuration of the second embodiment of the present disclosure.

As a result, by reducing the number of accesses of the decoder, it is possible to shorten the horizontal blanking period. Therefore, it is possible to achieve an increase in speed and achieve low power consumption by suppressing charge current and discharge current due to the decoder access.

As described above, the second embodiment of the present disclosure uses the regular transition sequence of the four states of the readout state RDST, the discharge state DCST, the electronic shutter state SHST, and the charge state CGST which are peculiar to the image sensor.

Further, in the second embodiment, the readout state and the electronic shutter state are not successively repeated during two horizontal scanning periods. By using the characteristic, the operation for clearing the memory (latch) state is performed regardless of the selection of the decoder for each time during the horizontal scanning period.

The second embodiment of the present disclosure does not limit the assignment of the memory (latch) states. However, in the embodiment, the essential point is that the memory (latch) assignment is performed by using the characteristic of the operation order of the image sensor and the number of decoding operations is reduced by resetting (or setting) the memories in common.

For example, the embodiment may be also applied to the following method: the electronic shutter state SHST is set as (10), the charge state CGST is set as (00), the readout state RDST is set as (11), and the discharge state is set as (01), thereby resetting the first memory (A memory) for each horizontal scanning period.

<3. Third Embodiment>

Figure 13:
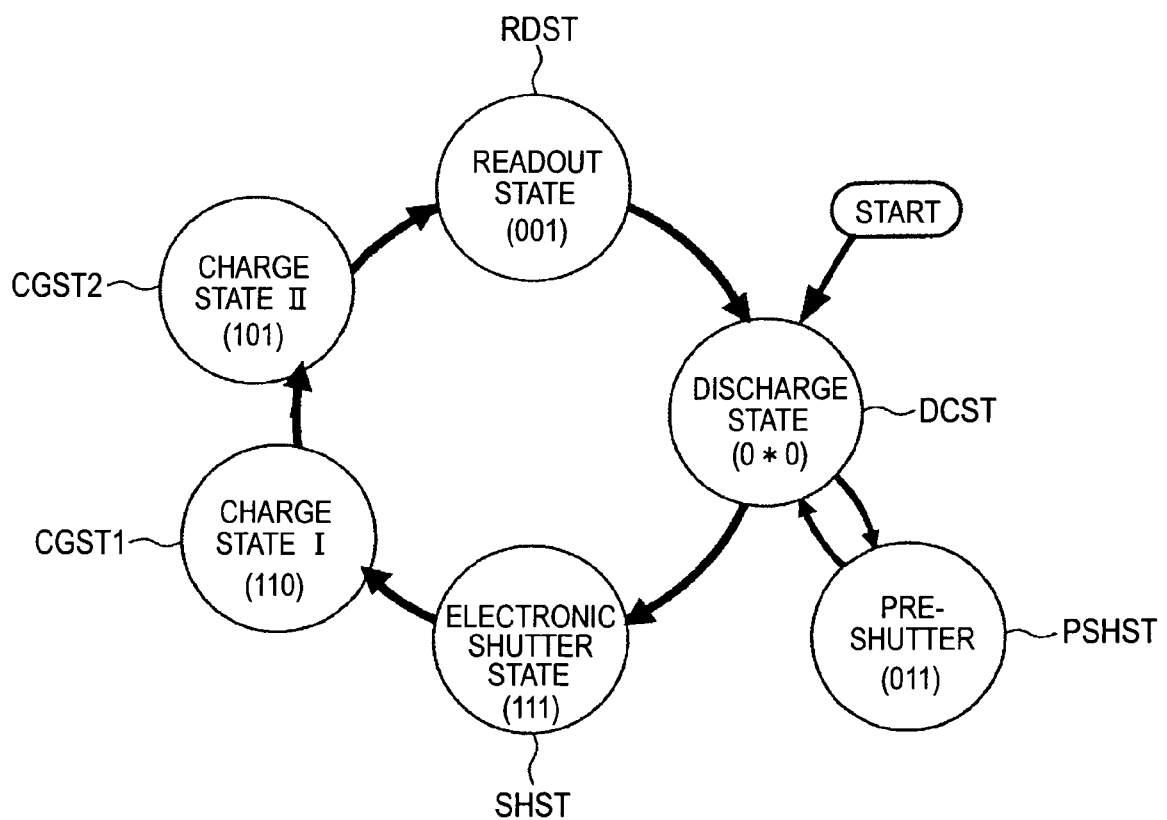
FIG. 13 is a diagram illustrating six states of a pixel according to a third embodiment and an example of a transition relationship thereof.

FIG. 13 is a diagram illustrating possible six states of a pixel according to a third embodiment and an example of a transition relationship thereof.

Figure 14:
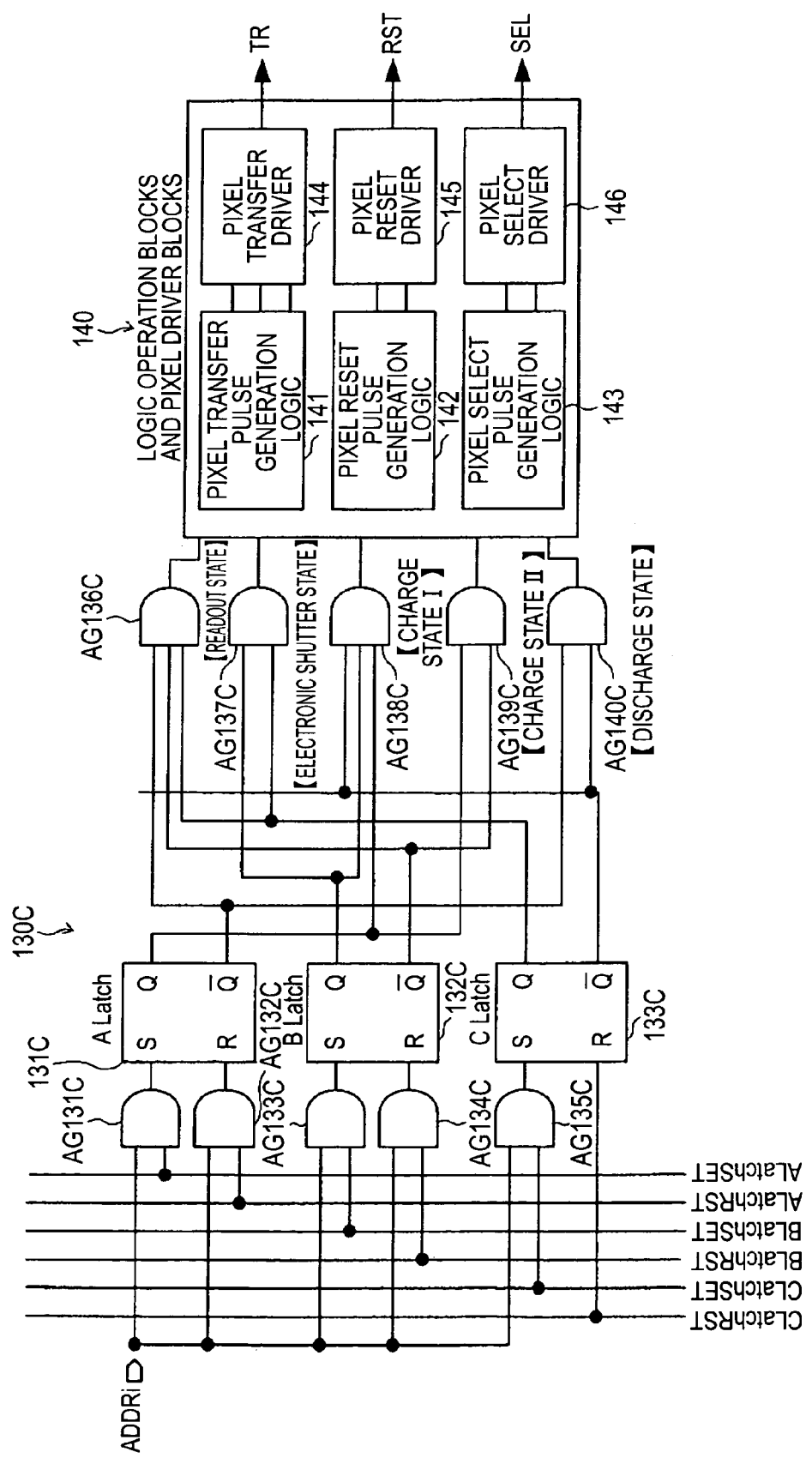
FIG. 14 is a diagram illustrating an example of a pixel driving timing control circuit and a memory control circuit of a vertical (row) selection circuit in a CMOS image sensor (the solid-state imaging device) according to the third embodiment.

FIG. 14 is a diagram illustrating an example of a pixel driving timing control circuit and a memory control circuit of a vertical (row) selection circuit in a CMOS image sensor (the solid-state imaging device) according to the third embodiment.

In the third embodiment, the charge state CGST of FIG. 3 is divided into two states CGST1 and CGST2, the gate voltage of the transfer transistor TR-Tr of each pixel is divided into two stages, and the pre-shutter state PSHST is included.

In the charge state CGST, immediately after the electronic shutter, the transfer transistor TR-Tr is not set to be perfectly non-conductive (OFF). Hence, the first charge state CGST1, in which the transfer gate control signal TR is set to the middle voltage Vmid2 for example −0.6 V, is provided at the first stage.

Then, in order for the transfer transistor TR-Tr to be perfectly non-conductive (OFF), the second charge state CGST2, in which the transfer gate control signal TR is shifted from the second middle voltage Vmid2 and set to the second level voltage for example −1.2 V, is provided at the second stage.

As described above, in the third embodiment, the vertical selection circuit 170, which is a part of the pixel driving section, is configured to be able to control the pixel state of the row, which is designated by the row (vertical) address decoded through the address decoder 120, in the six states as shown in FIG. 13.

The six states include, as shown in FIG. 13, the readout state RDST, the discharge state DCST, the electronic shutter state SHST, the first charge state CGST1, the second charge state CGST2, and pre-shutter state PSHST.

In addition, the control is performed such that the six states sequentially transition from one to another.

In the third embodiment, the memory control circuit 130C has memories (A, B, C) which are three latches, and the six states are set by a combination between the set states (1) and the reset states (0) of the three memories, thereby controlling the memories.

In the readout state RDST, the memories (A, B, C) are set to (0, 0, 1), and in the discharge state, the memories (A, B, C) are set to (0, *, 0).

In the electronic shutter state SHST, the memories (A, B, C) are set to (1, 1, 1), in the first charge state CGST1, the memories (A, B, C) are set to (1, 1, 0), and in the second charge state CGST2, the memories (A, B, C) are set to (1, 0, 1).

Further, in the pre-shutter state PSHST, the memories (A, B, C) are set to (0, 1, 1).

Here, a description is given of a case where state assignment is performed such that each state is represented by binary digits in order of the first memory (A memory) 131, the second memory (B memory) 132, and the third memory (C memory) 133.

In the third embodiment of the present disclosure, the essential point is controlling two states of which the transfer gate voltages are different during the charge period. Thus, the embodiment does not limit the memory assignment.

Further, the third embodiment of the present disclosure includes the pre-shutter state PSHST.

In the pre-shutter state PSHST, the same pixel access motion as the electronic shutter is performed. This is an operation which performs the two or more successive or substantially successive electronic shutter operations in order to prevent the readout remaining of electric charge of the electronic shutter regulating exposure.

Furthermore, the present disclosure is not limited to only the memory state assignment described in the embodiment.

Hereinafter, a description will be given of a specific exemplary configuration in which the six states of the vertical (row) selection circuit 170C according to the third embodiment are collectively controlled, with reference to FIG. 14.

In addition, the memory (latch) control circuit 130C and the pixel driving timing control circuit 140C having characteristic configurations will be described with reference to a specific example.

The memory control circuit 130C of FIG. 14 has 2-input or 3-input AND gates AG131C to AG140C, a first memory (A memory) 131C, a second memory (B memory) 132C, and a third memory (C memory) 133C.

The memory control circuit 130C is supplied, from the sensor controller 150, with an A-memory (latch) set control signal ALatchSET and an A-memory (latch) reset control signal ALatchRST.

The memory control circuit 130C is supplied, from the sensor controller 150, with a B-memory (latch) set control signal BLatchSET and a B-memory (latch) reset control signal BLatchRST.

The memory control circuit 130C is supplied, from the sensor controller 150, with a C-memory (latch) set control signal CLatchSET and a C-memory (latch) reset control signal CLatchRST.

One input terminal of each of the AND gates AG131C to AG135C is supplied with an output signal ADDRi of the address decoder 120.

The other input terminal of the AND gate AG131C is supplied with the A-memory (latch) set control signal ALatchSET, and the other input terminal of the AND gate AG132C is supplied with the A-memory (latch) reset control signal ALatchRST.

The other input terminal of the AND gate AG133C is supplied with the B-memory (latch) set control signal BLatchSET, and the other input terminal of the AND gate AG134C is supplied with the B-memory (latch) reset control signal BLatchRST.

The other input terminal of the AND gate AG135C is supplied with the C-memory (latch) set control signal CLatchSET.

A set terminal S of the first memory (A memory) 131C is connected to the output of the AND gate AG131C, and a reset terminal R thereof is connected to the output of the AND gate AG132C.

An output terminal Q of the first memory (A memory) 131C is connected to each first input terminal of the AND gates AG138C and AG139C. An inverted output terminal $\overline{Q}$ of the first memory (A memory) 131C is connected to a first input terminal of the AND gate AG136C and a first input terminal of the AND gate AG140C.

A set terminal S of the second memory (B memory) 132C is connected to the output of the AND gate AG133C, and a reset terminal R thereof is connected to the output of the AND gate AG134C.

An output terminal Q of the second memory (B memory) 132C is connected to a first input terminal of the AND gate AG137C and the other first input terminal of the AND gate AG138C. An inverted output terminal $\overline{Q}$ of the second memory (B memory) 132C is connected to a second input terminal of the AND gate AG136C and a second input terminal of the AND gate AG139C.

A set terminal S of the third memory (C memory) 133C is connected to the output of the AND gate AG135C, and a reset terminal R thereof is connected to a supply line of the C-memory (latch) set control signal CLatchSET.

An output terminal Q of the third memory (C memory) 133C is connected to a third input terminal of the AND gate AG136C and the other second input terminal of the AND gate AG137C. An inverted output terminal $\overline{Q}$ of the third memory (C memory) 133C is connected to a first input terminal of the AND gate AG138C and a second input terminal of the AND gate AG140C.

The output of the AND gate AG136C is a control signal of the readout state RDST, and the output of the AND gate AG137C is a control signal of the electronic shutter state SHST. In addition, the output of the AND gate AG138C is a control signal of the first charge state CGST1.

The output of the AND gate AG130C is a control signal of the second charge state CGDT2, and the output of the AND gate AG138 is a control signal of the discharge state DCST.

As described above, in the third embodiment, the memory control circuit 130C has memories (A, B, C) which are three latches, and the six states are set by the combination between the set states (1) and the reset states (0) of the three memories, thereby controlling the memories.

In the readout state RDST, the memories (A, B, C) are set to (0, 0, 1), and in the discharge state, the memories (A, B, C) are set to (0, *, 0).

In the electronic shutter state SHST, the memories (A, B, C) are set to (1, 1, 1), in the first charge state CGST1, the memories (A, B, C) are set to (1, 1, 0), and in the second charge state CGST2, the memories (A, B, C) are set to (1, 0, 1).

Further, in the pre-shutter state PSHST, the memories (A, B, C) are set to (0, 1, 1).

It should be noted that the present disclosure is not limited to only the memory state assignment described in the embodiment.

In memory control circuit 130, the first memory (A memory) 131 is set by logical product between the output of the address decoder 120 and the A-memory (latch) set control signal ALatchSET of the sensor controller 150.

The first memory (A memory) 131 is reset by the logical product between the output of the address decoder 120 and the A-memory (latch) reset control signal ALatchRST of the sensor controller 150.

In the memory control circuit 130, the second memory (B memory) 132 is set by the logical product between the output of the address decoder 120 and the B-memory (latch) set control signal BLatchSET of the sensor controller 150.

The second memory (B memory) 132 is reset by logical product between the output of the address decoder 120 and the B-memory (latch) reset control signal BLatchRST of the sensor controller 150.

In memory control circuit 130C, the first memory (A memory) 131C is set by logical product between the output of the address decoder 120 and the A-memory (latch) set control signal ALatchSET of the sensor controller 150.

The first memory (A memory) 131C is reset by the logical product between the output of the address decoder 120 and the A-memory (latch) reset control signal ALatchRST of the sensor controller 150.

In the memory control circuit 130C, the second memory (B memory) 132C is set by the logical product between the output of the address decoder 120 and the B-memory (latch) set control signal BLatchSET of the sensor controller 150.

The second memory (B memory) 132C is reset by the logical product between the output of the address decoder 120 and the B-memory (latch) reset control signal BLatchRST of the sensor controller 150.

In the memory control circuit 130C, the third memory (C memory) 133C is set by the logical product between the output of the address decoder 120 and the C-memory (latch) set control signal CLatchSET of the sensor controller 150.

The third memory (C memory) 133C is directly reset by the C-memory (latch) reset control signal CLatc.

Figure 15:
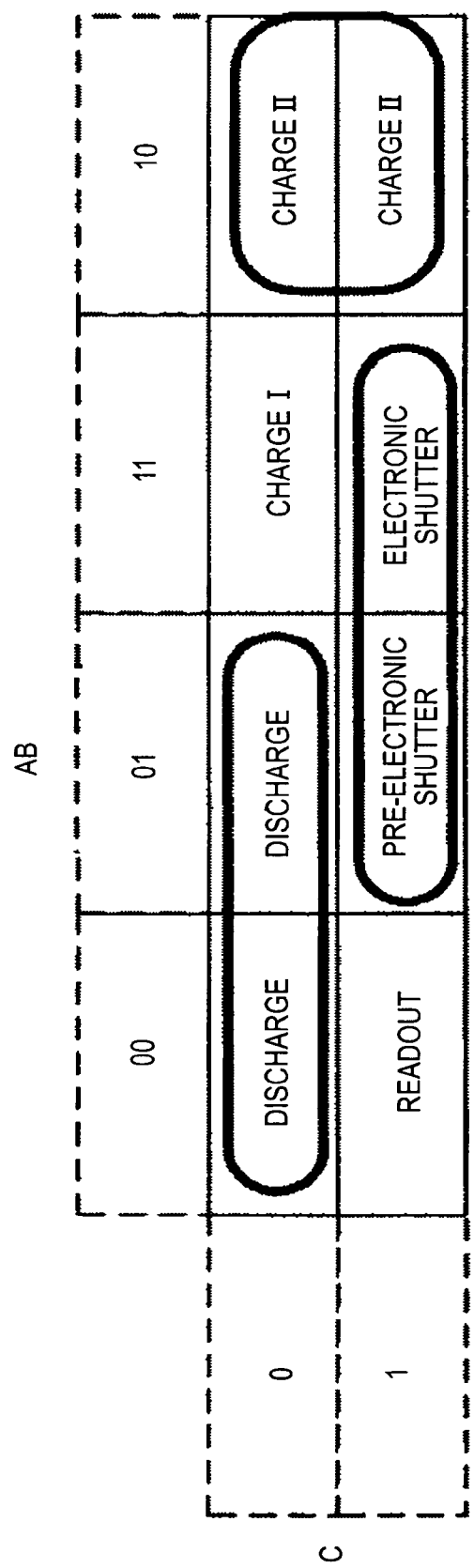
FIG. 15 is a diagram illustrating three memory (latch) state assignment according to the third embodiment.

FIG. 15 is a diagram illustrating three memory (latch) state assignment according to the third embodiment.

In the third embodiment, the logic operation shown in FIG. 15 is performed, and the pixel control signal corresponding to each logical assignment is generated, in form of pulses, from the vertical selection circuit 170C. The state transition is shown in FIG. 12.

The transfer gate control signal TR of each pixel has at least three voltage states so as to thereby control opening and closing states of the transfer transistor TR-Tr of each pixel.

One of the states is the perfectly conductive state, and is set when electric charge is read out or when electric charge in the electronic shutter is discharged.

Another one of the states is the perfectly non-conductive state, and is a state in which the transfer transistor TR-Tr of each pixel is perfectly turned off since it is possible to accumulate a larger amount of electric charge in the photodiode 111.

The other one of the state is the intermediate electric potential (middle voltage) state. In the embodiment, it is preferable that the voltage in this state should be a voltage at which it is possible to obtain a state where used electric charge is pinned under the gate of the transfer transistor. As a result, occurrence of dark current is suppressed.

Further, simultaneously, the electric charge in the photodiode 111 is in a state lower than the perfectly non-conductive state. The reason is that it is preferable that the voltage in this state should be set to a voltage at which the transfer transistor TR-Tr is not closed and thus electric charge overflows.

Figure 16:
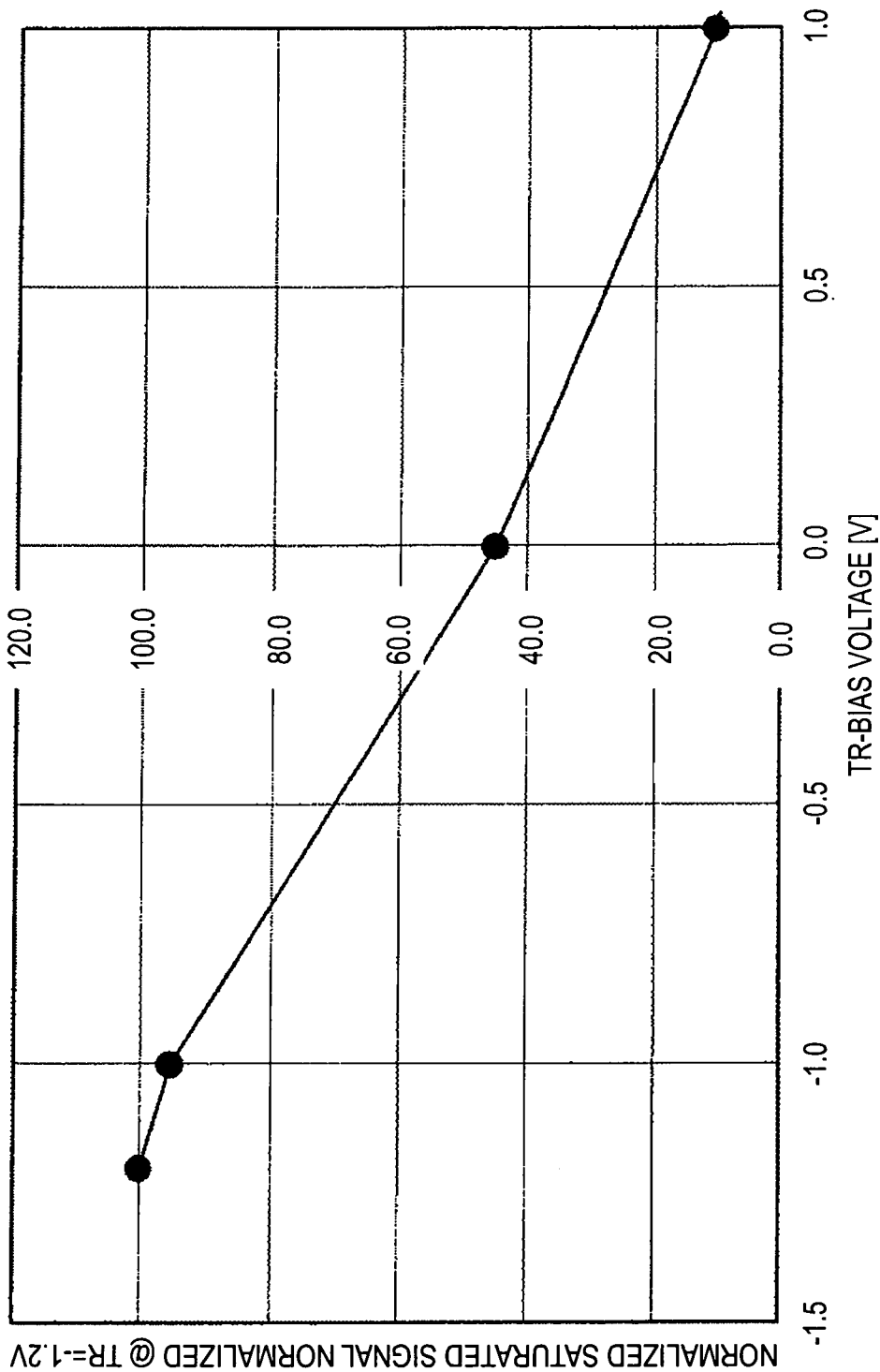
FIG. 16 is a diagram illustrating a relationship between a saturated signal of a photodiode and a hold voltage of a gate of a transfer transistor of a pixel.

FIG. 16 is a diagram illustrating a relationship between a saturated signal of the photodiode and a hold voltage of the gate of the transfer transistor of each pixel.

In FIG. 16, the gate voltage of the transfer transistor of each pixel is normalized at −1.2 V.

Figure 17A:
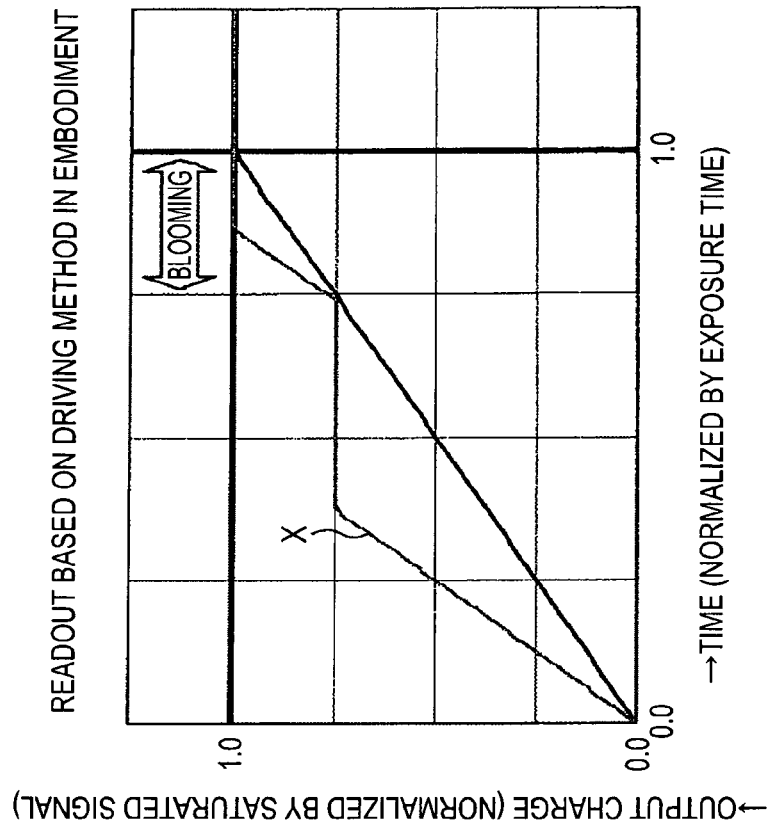
FIGS. 17A and 17B are diagrams illustrating an effect of a blooming occurrence time period in a case where a gate voltage of the transfer transistor of the pixel is changed in two steps.
Figure 17B:
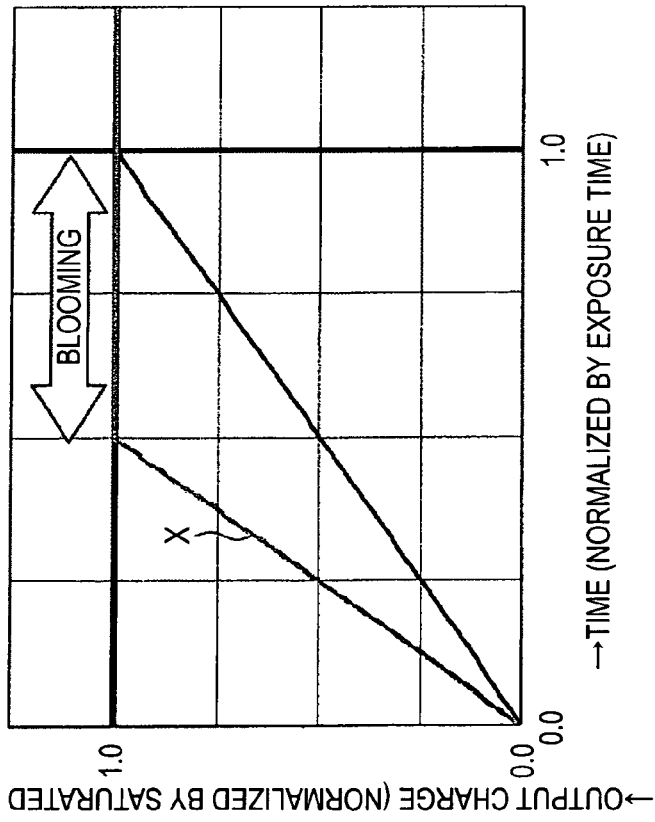

FIGS. 17A and 17B are diagrams illustrating an effect of a blooming occurrence time period in a case where a gate voltage of the transfer transistor of the pixel is changed in two steps. FIG. 17A shows a case of readout performed by a driving method in the related art, and FIG. 17B is a case of readout performed by a driving method implemented in the present disclosure.

Here, for example, the following case is studied: the voltage in the perfectly non-conductive state is set to −1.2 V, and thus −0.6 V corresponding to 75% of the saturated signal is used as the middle voltage Vmid2.

In FIG. 16, the horizontal axis is normalized by the exposure time from the electronic shutter to the readout, and the vertical axis is normalized by the saturated signal of the photodiode.

In FIGS. 17A and 17B, the line X represents a case of incidence of light which has intensity two times that of the light by which the photodiode is saturated in accordance with the exposure time.

In a case of a circuit used in the related art, the photodiode is saturated by the light with double intensity during a period 0.5 times the exposure time, and electric charge therein leaks out around each pixel. As a result, image quality deteriorates.

In contrast, in a case of using the circuit according to an embodiment of the present disclosure, the middle voltage, which corresponds to 75% of the saturated signal, is set in the gate of the transfer transistor TR-Tr. In this case, similarly to the above example, when the light with double intensity is incident, electric charge overflows once at an output corresponding to 75% of the saturated signal.

The electric charge, which overflows at that time, is discharged to the FD through the transfer gate with a low potential, and thus does not leak out to the adjacent pixels.

Further, after a desired charge time passes, when the gate of the transfer transistor is set to a voltage for achieving the perfectly non-conductive state, the output of the electric charge is enhanced. Accordingly, due to the saturated signal output, the electric charge overflows from the photodiode to the pixels adjacent thereto.

However, blooming occurrence time in this configuration is shorter than that in the circuit used in the related art. From this viewpoint, it can be expected that it is possible to suppress deterioration in image quality caused by blooming.

Furthermore, it is preferable that the timing of change from the first accumulation voltage to the second accumulation voltage should be substantially equal to or less than the saturated signal ratio of the first accumulation voltage to the second accumulation voltage.

In this example, since the ratio is 75%, the ratio of the first charge time to the second charge time is set to 75:25.

For example, when the time is set to be longer than 75% under the same voltage condition, although light with double intensity is incident, the saturated signal level is not reached.

Figure 18:
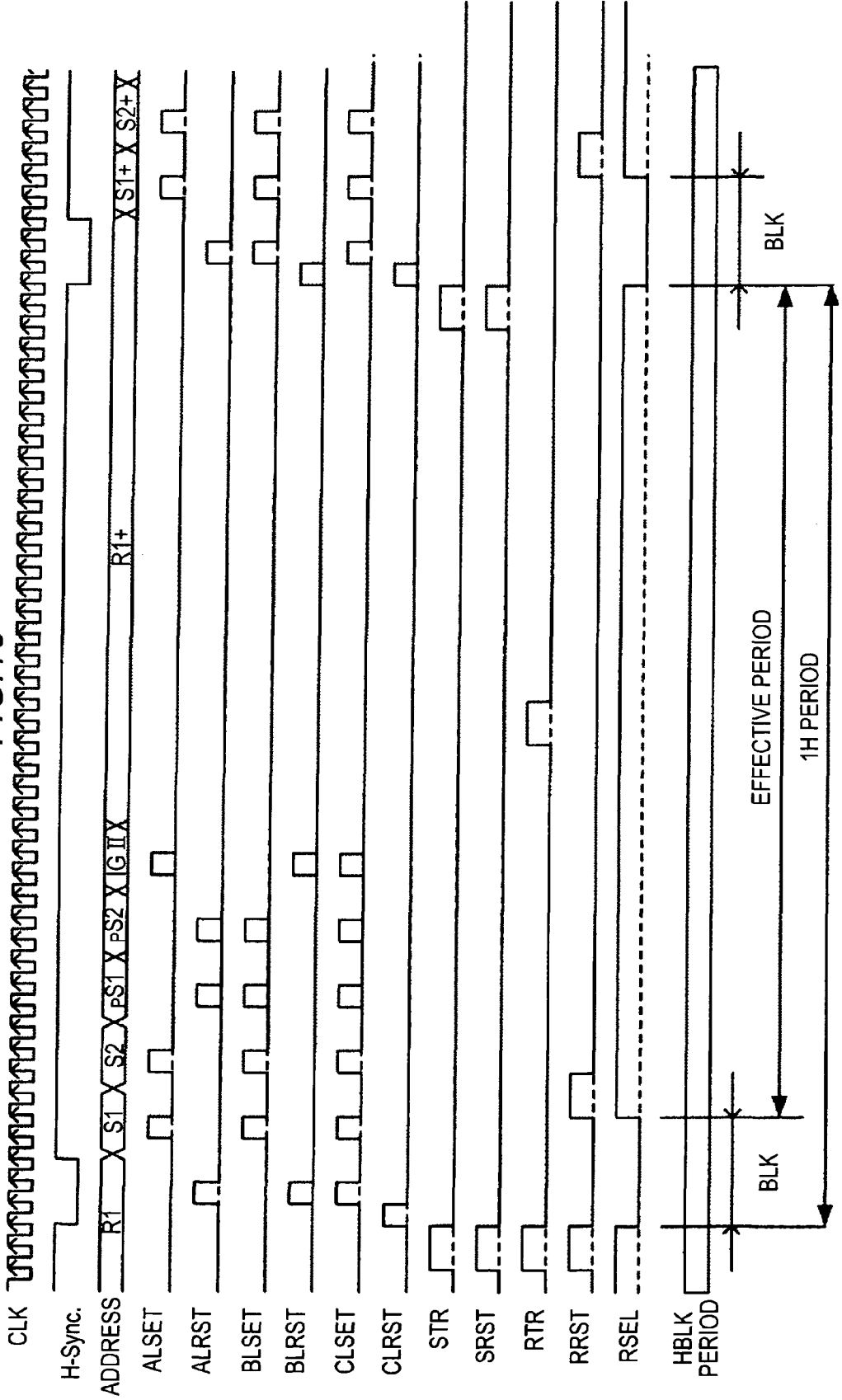
FIG. 18 is a diagram illustrating a timing chart with a focus on operations of the vertical (row) selection circuit according to the third embodiment.

FIG. 18 is a diagram illustrating a timing chart with a focus on operations of the vertical (row) selection circuit according to the third embodiment.

FIG. 18 describes a unit of single horizontal scanning period.

First, the third memory (C memory) 133C is reset. On the basis of this setting, the pre-shutter (pSH) state PSHST transitions to the discharge state, the electronic shutter state SHST transitions to the second charge state CGST2, and the readout state RDST transitions to the discharge state DCST all at once.

On the basis of the memory state assignment set as described above and a memory clear signal independent of the decoder signal, it is possible to shorten the decoding period.

Subsequently, the readout row, the electronic shutter row, the pre-shutter row, and the second charge state CGST2 are respectively set.

In the description of the third embodiment, when the charge time is longer than that of the previous frame, two electronic shutter addresses are generated.

As described above, according to the embodiment, it is possible to obtain the following effects.

The CMOS sensor according to the embodiment has a vertical selection circuit which is capable of achieving one or both of: suppression of blooming of electric charge from pixels (row) on which readout of electric charge is not performed; and suppression of blooming between readout pixels while holding, at a high level, the saturated signals of pixels (row) on which readout of electric charge is performed.

According to the embodiment, it is possible to realize the vertical selection circuit with a small circuit size.

Further, in the circuit system, the essential point is that, while providing a plurality of states in the vertical selection circuit with a small circuit size, it is possible to reduce the number of accesses of the decoder necessary to control the memory states, and it is also possible to achieve an increase in speed of readout.

Furthermore, during the non-selection period of each pixel, the state, in which the transfer transistor of each pixel is open, is controlled. Thereby, it is possible to support not only a thinning-out mode, in which the address of the decoder monotonously increases, such as ½, ⅓, and ¼ thinning-out modes used in the related art but also a complex thinning-out mode in which the readout operation is performed while an increase and a decrease of the address are repeated.

Further, the CMOS image sensor according to the embodiment is not particularly limited. However, it may be possible to employ, for example, a CMOS image sensor equipped with a column-parallel analog-digital conversion device (hereinafter abbreviated as ADC (Analog Digital Converter)).

The solid-state imaging device having the above-mentioned effects can be used as an imaging device of a digital camera or a video camera.

<4. Fourth Embodiment>

Figure 19:
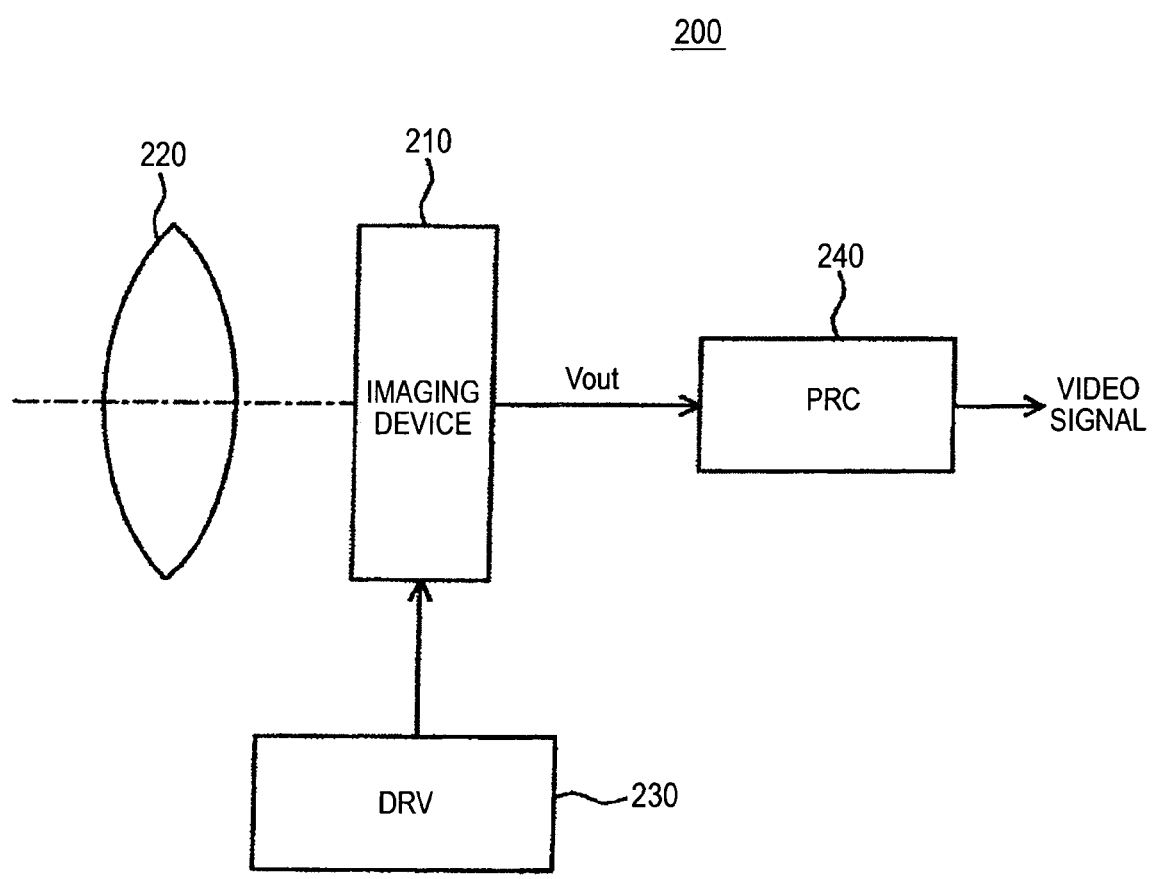
FIG. 19 is a diagram illustrating an exemplary configuration of a camera system using a solid-state imaging device according to a fourth embodiment of the present disclosure.

FIG. 19 is a diagram illustrating an exemplary configuration of a camera system using a solid-state imaging device according to a fourth embodiment of the present disclosure.

The camera system 200 includes, as shown in FIG. 19, an imaging device 210 to which the CMOS image sensor (the solid-state imaging device) 100 according to the embodiments are applicable.

The camera system 200 further includes an optical system that guides incident light to (forms a subject image on) the pixel area of the imaging device 210, for example, a lens 220 that forms an image of the incident light (image light) on the imaging surface.

The camera system 200 further includes a driving circuit (DRV) 230 that drives the imaging device 210 and a signal processing circuit (PRC) 240 that processes an output signal of the imaging device 210.

The driving circuit 230 includes a timing generator (not shown) that produces a various timing signals including a start pulse and clock pulses for driving the circuits in the imaging device 210. The driving circuit 230 drives the imaging device 210 by using predetermined timing signals.

Further, the signal processing circuit 240 performs predetermined signal processing on the output signal of the imaging device 210.

The image signal, which is processed by the signal processing circuit 240, is recorded in a recording medium such as a memory. The image information recorded on the recording medium is formed as a hard copy by using a printer or the like. Further, the image signal, which is processed by the signal processing circuit 240, is also displayed as video images on a monitor formed of a liquid crystal display or the like.

As described above, in an image capturing apparatus such as a digital still camera, by incorporating the above-mentioned CMOS image sensor (the solid-state imaging device) 100 as the imaging device 210, it is possible to realize a high-precision camera system with a low power consumption.

The present disclosure contains subject matter related to that disclosed in Japanese Priority Patent Application JP 2010-157337 filed in the Japan Patent Office on Jul. 9, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
a pixel section configured to have a plurality of pixels, each which includes a photoelectric conversion element; and
a pixel driving section configured to have a row selection circuit which controls operations of the pixels, wherein the row selection circuit configured to select at least a readout row and a shutter row has at least two latches that hold data from the photoelectric conversion element and removes the held data in response to an address signal and control signals, wherein the row selection circuit has at least:
a first latch that holds the data in response to the address signal and a first set control signal and removes the held the data in response to the address signal and a first reset control signal, and
a second latch that holds the data in response to the address signal and a second set control signal and removes the data in response to at least a second reset control signal, wherein the row selection circuit sets at least a readout state, a discharge state, an electronic shutter state, and a charge state by the combination of the hold and removal states of the first latch and the second latch, wherein the row selection circuit has logic operation circuits, which are compatible with at least three states among output states of the first latch and the second latch, provided on output sides of the first latch and the second latch.

2. The solid-state imaging device according to claim 1, wherein the row selection circuit causes the readout row to transition from the readout state to the discharge state, and causes the shutter row to transition from the electronic shutter state to the charge state.

3. The solid-state imaging device according to claim 1, wherein the row selection circuit controls an operation order of pixel access such that transition is made in order of the readout state, the discharge state, the electronic shutter state, and the charge state and the transition is made to return to the readout state.

4. The solid-state imaging device according to claim 1, wherein each of the pixels includes an output node, the photoelectric conversion element that converts an optical signal into an electric signal and accumulates signal charge, and a transfer transistor that is set, in response to a transfer control signal level applied to a gate thereof, in a conductive state, a non-conductive state, or an intermediate conductive state, which is an intermediate state between the conductive state and the non-conductive state, and transfers electric charge of the photoelectric conversion element to the output node in the conductive state and the intermediate conductive state, and the row selection circuit sets, in the readout state and the electronic shutter state, the transfer control signal to a first level voltage, by which the transfer transistor is put into a conductive state, or a second level voltage, by which the transfer transistor is put into a non-conductive state, and in the discharge state, the transfer control signal to a middle voltage between the first level voltage and the second level voltage such that the transfer transistor is put into an intermediate conductive state.

5. The solid-state imaging device according to claim 1, wherein the three states include the readout state, the discharge state, and the electronic shutter state.

6. The solid-state imaging device according to claim 1, wherein the row selection circuit is able to set four or more states, of which pixel control operations are independent and which include at least the readout state, the discharge state, the electronic shutter state, and the charge state, for each unit array, and the row selection circuit has a memory control period of setting the unit array, which is set to the readout state during a previous horizontal scanning period, to the discharge state, a memory control period of setting the unit array, which is set to the electronic shutter state during the previous horizontal scanning period, to the charge state, and a memory control period of performing the respective settings to the readout state and the electronic shutter state.

7. A solid-state imaging device comprising:
a pixel section configured to have a plurality of pixels, each of which includes a photoelectric conversion element; and
a pixel driving section configured to have a row selection circuit which controls operations of the pixels,
wherein the row selection circuit configured to select at least a readout row and a shutter row has at least two latches that hold data from the photoelectric conversion element and removes the held data in response to an address signal and control signals,
wherein the row selection circuit has at least:
one or more first latches that hold the data in response to the address signal and a first set control signal and remove the held the data in response to the address signal and a first reset control signal, and
a second latch that holds the data in response to the address signal and a second set control signal and removes the data in response to a second reset control signal,
wherein the row selection circuit is able to set at least a readout state, a discharge state, an electronic shutter state, and a charge state by the combination of the hold and removal states of the first latches and the second latch, and
wherein the row selection circuit has logic operation circuits, which are compatible with at least three states among output states of the first latches and the second latch, provided on output sides of the first latches and the second latch.

8. The solid-state imaging device according to claim 7, wherein the three states include the readout state, the discharge state, and the electronic shutter state.

9. The solid-state imaging device according to claim 7, wherein the row selection circuit is able to set four or more states, of which pixel control operations are independent and which include at least the readout state, the discharge state, the electronic shutter state, and the charge state, for each unit array, and the row selection circuit has a memory control period of simultaneously setting, in parallel, two state transitions of a latch control, by which the unit array of a V selection circuit set to the readout state during a previous horizontal scanning period is set to a discharge state, and a latch control, by which the unit array set to the electronic shutter state during the previous horizontal scanning period is set to the charge state, and a memory control period of performing the respective settings to the readout state and the electronic shutter state.

10. A camera system comprising:
a solid-state imaging device according to claim 7;
an optical system that forms a subject image on the solid-state imaging device; and
a signal processing circuit that processes an output image signal of the solid-state imaging device.

* * * * *